(12) United States Patent
Kim et al.

(10) Patent No.: US 11,039,262 B2
(45) Date of Patent: Jun. 15, 2021

(54) DIRECTIONAL ACOUSTIC SENSOR AND ELECTRONIC DEVICE INCLUDING THE SAME

(71) Applicant: SAMSUNG ELECTRONICS CO., LTD., Suwon-si (KR)

(72) Inventors: Cheheung Kim, Yongin-si (KR); Sungchan Kang, Hwaseong-si (KR); Yongseop Yoon, Seoul (KR); Choongho Rhee, Anyang-si (KR); Sangha Park, Seoul (KR); Hyeokki Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 281 days.

(21) Appl. No.: 16/162,795

(22) Filed: Oct. 17, 2018

(65) Prior Publication Data
US 2019/0174244 A1   Jun. 6, 2019

(30) Foreign Application Priority Data

Dec. 6, 2017 (KR) ...................... 10-2017-0166643

(51) Int. Cl.
*H04R 17/02* (2006.01)
*H04S 7/00* (2006.01)
(Continued)

(52) U.S. Cl.
CPC ............ *H04S 7/30* (2013.01); *B60K 35/00* (2013.01); *G06F 3/167* (2013.01);
(Continued)

(58) Field of Classification Search
None
See application file for complete search history.

(56) References Cited

U.S. PATENT DOCUMENTS 5,856,722 A * 1/1999 Haronian ............... G01H 3/08
310/309
7,944,130 B2   5/2011 Park et al.
(Continued)

FOREIGN PATENT DOCUMENTS

EP   2884762 A1   6/2015
EP   2986024 A1   2/2016
(Continued)

OTHER PUBLICATIONS

Communication dated May 2, 2019, issued by the European Patent Office in counterpart European Application No. 18210266.5.

*Primary Examiner* — James K Mooney
(74) *Attorney, Agent, or Firm* — Sughrue Mion, PLLC

(57) ABSTRACT

Provided are a directional acoustic sensor that detects a direction of sound, a method of detecting a direction of sound, and an electronic device including the directional acoustic sensor. The directional acoustic sensor includes a sound inlet through which a sound is received, a sound outlet through which the sound received through the sound inlet is output, and a plurality of vibration bodies arranged between the sound inlet and the sound outlet, in which one or more of the plurality of vibration bodies selectively react to the sound received by the sound inlet according to a direction of the received sound.

23 Claims, 18 Drawing Sheets

(51) Int. Cl.

| | |
|---|---|
| *H04R 5/04* | (2006.01) |
| *G10L 21/0216* | (2013.01) |
| *H04R 1/32* | (2006.01) |
| *B60K 35/00* | (2006.01) |
| *G06F 3/16* | (2006.01) |
| *H04R 1/40* | (2006.01) |
| *H04R 1/24* | (2006.01) |

(52) U.S. Cl.
CPC .......... *G10L 21/0216* (2013.01); *H04R 1/245* (2013.01); *H04R 1/323* (2013.01); *H04R 1/406* (2013.01); *H04R 5/04* (2013.01); *B60K 2370/148* (2019.05); *G10L 2021/02165* (2013.01); *H04R 17/02* (2013.01); *H04R 17/025* (2013.01); *H04R 2201/003* (2013.01); *H04R 2201/401* (2013.01); *H04S 2400/01* (2013.01)

(56) References Cited

U.S. PATENT DOCUMENTS

| | | | |
|---|---|---|---|
| 9,462,364 B2 | 10/2016 | Uchida et al. | |
| 2012/0053393 A1* | 3/2012 | Kaltenbacher | H04R 25/606 600/25 |
| 2014/0084395 A1 | 3/2014 | Sparks et al. | |
| 2016/0050506 A1* | 2/2016 | Kim | H04R 7/08 381/56 |
| 2018/0077497 A1* | 3/2018 | Hatipoglu | H04R 17/02 |
| 2019/0072635 A1 | 3/2019 | Kang et al. | |

FOREIGN PATENT DOCUMENTS

| | | | |
|---|---|---|---|
| JP | 3353728 | B2 | 12/2002 |
| JP | 5275488 | B2 | 8/2013 |

\* cited by examiner

DIRECTIONAL ACOUSTIC SENSOR AND ELECTRONIC DEVICE INCLUDING THE SAME

CROSS-REFERENCE TO RELATED APPLICATION

This application claims priority from Korean Patent Application No. 10-2017-0166643, filed on Dec. 6, 2017, in the Korean Intellectual Property Office, the disclosure of which is incorporated herein in its entirety by reference.

BACKGROUND

1. Field

Apparatuses and methods consistent with example embodiments relate to a directional acoustic sensor that detects a direction of sound and an electronic device including the directional acoustic sensor.

2. Description of the Related Art

Utilization of a sensor mounted on a home appliance, an image display device, a virtual reality device, an intelligent speaker, etc., to detect a direction from which sound is incident and to recognize a voice is increasing.

A sensor for detecting a direction of sound generally calculates the direction from which the sound is incident by using a time difference of incidence of the sound at a plurality of microphones. When such a plurality of microphones are used to sense the time difference, the plurality of microphones have to be spaced apart from each other by a sufficient distance. As a result, the total volume of the system is large and the system is complex to install. Moreover, a phase differences among the plurality of microphones has to be calculated at all times.

SUMMARY

One or more example embodiments may provide a directional acoustic sensor configured to detect a direction of sound.

One or more example embodiments may provide an electronic device which includes a directional acoustic sensor to use directional information of sensed sound in various ways.

One or more example embodiments may provide a directional acoustic sensor implementing radial directivity using a single sensor structure with a plurality of vibration bodies arranged radially around 360 degrees, wherein each vibration member has its own directivity.

Additional example aspects and advantages will be set forth in part in the description which follows and, in part, will be apparent from the description, or may be learned by practice of the presented example embodiments.

According to an aspect of an example embodiment, a directional acoustic sensor includes a sound inlet through which a sound is received, a sound outlet through which the sound received through the sound inlet is output, and a plurality of vibration bodies arranged between the sound inlet and the sound outlet, wherein one or more of the plurality of vibration bodies selectively react to the sound received through the sound inlet according to a direction of the received sound.

The plurality of vibration bodies may be arranged on a single plane in an array surrounding a central point of the plane, wherein the central point is aligned, in a vertical direction, with a center of the sound inlet.

The array may be symmetric with respect to the central point.

The array may have a shape of a circle, an oval, or a polygon.

The sound outlet may overlap, in a vertical direction, with all of the plurality of vibration bodies.

The sound outlet may be a plurality of sound outlets respectively corresponding to the plurality of vibration bodies.

Each of the plurality of vibration bodies may have an identical resonant frequency.

The plurality of vibration bodies may include different vibration bodies having different resonant frequencies.

The plurality of vibration bodies may be grouped into a plurality of subgroups, each subgroup oriented in a different direction, and each of the plurality of subgroups may include different vibration bodies having different resonant frequencies.

The plurality of vibration bodies included in each of the plurality of subgroups may be arranged in an order of a magnitude of a resonant frequency.

Among the plurality of subgroups, in adjacent subgroups, a plurality of vibration bodies may be arranged in opposite orders of magnitude of resonant frequency.

The plurality of subgroups may be arranged such that vibration bodies arranged symmetrically to each other with respect to a central point of arrangement of the plurality of vibration bodies may have an identical resonant frequency.

According to an aspect of another example embodiment, a method of detecting a direction of a sound includes providing a vibration body array including a plurality of vibration bodies arranged such that one or more of the plurality of vibration bodies selectively react to a received sound based on a direction of the received sound, and estimating a sound source distribution profile of a target sound by comparing outputs of the plurality of vibration bodies with each other, when the target sound is received to the vibration body array.

The method may further include, for the vibration body array, setting a matching graph for estimating a direction of a received sound based on an output of each of the plurality of vibration bodies, in which the estimating of the direction of the received sound may include determining a direction of the target sound by comparing an amplitude of one or more vibration bodies reacting to the target sound with the matching graph.

The setting of the matching graph may include setting a plurality of matching graphs indicating a relationship between an amplitude difference between two vibration bodies included in the vibration body array and a direction of a received sound.

According to an aspect of another example embodiment, an Internet of Things (IoT) device includes the directional acoustic sensor, which is configured to receive a voice signal provided by a user, a memory in which an application module is stored, and a processor configured to execute the application module.

The IoT device may further include a movable device capable of rotating or otherwise moving and a control module configured to rotate or otherwise move the movable device in a specific direction based on an execution result of the application module executed using a sound signal received by the directional acoustic sensor as an input variable.

The movable device may include an output device configured to output the execution result of the application module.

The IoT device may further include a learning module configured to learn whether a signal received by the directional acoustic sensor is a valid input sound signal in association with a direction.

According to an aspect of another example embodiment, a vehicle voice interface device includes the directional acoustic sensor and a valid signal extraction module configured to determine whether a sound signal received by the directional acoustic sensor is a valid sound signal based on a direction of the sound signal, and to deliver the sound signal to a vehicle control module when the sound signal is a valid sound signal.

The valid signal extraction module may be further configured to cancel, as noise, a sound signal having a direction different from a direction of a driver as noise and to deliver the noise-cancelled sound signal to the vehicle control module.

According to an aspect of another example embodiment, a spatial recording device includes the directional acoustic sensor, a processor configured to determine a direction of a sound signal received by the directional acoustic sensor by analyzing the sound signal sensed by the directional acoustic sensor, and a memory in which a program for signal processing by the processor and an execution result of the processor are stored.

The spatial recording device may further include a multi-channel speaker, in which the processor is further configured to control the multi-channel speaker such that an audio signal stored in the memory is played appropriately to a direction.

According to an aspect of another example embodiment, an omnidirectional camera includes the directional acoustic sensor, an omnidirectional photographing module, a processor configured to control the directional acoustic sensor and the omnidirectional photographing module such that a directional sound signal sensed by the directional acoustic sensor and an omnidirectional image signal captured by the omnidirectional photographing module match each other, and a memory in which the directional sound signal and the omnidirectional image signal are stored.

BRIEF DESCRIPTION OF THE DRAWINGS

These and/or other example aspects and advantages will become apparent and more readily appreciated from the following description of example embodiments, taken in conjunction with the accompanying drawings in which.

DETAILED DESCRIPTION

Figure 1:
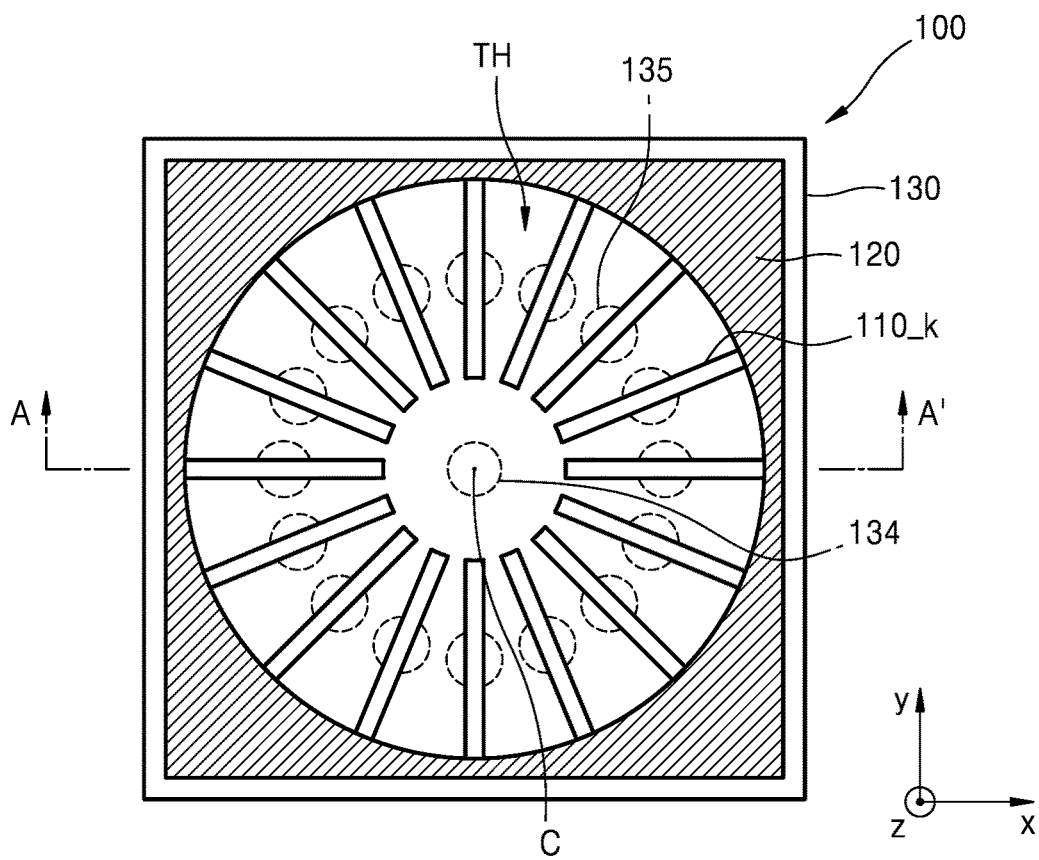
FIG. 1 is a plan view illustrating a structure of a directional acoustic sensor according to an example embodiment.

Reference will now be made in detail to example embodiments which are illustrated in the accompanying drawings, wherein like reference numerals refer to like elements throughout. In this regard, the present embodiments may have different forms and should not be construed as being limited to the descriptions set forth herein. Accordingly, the example embodiments are merely described below, by referring to the figures, to explain aspects. Expressions such as "at least one of," when preceding a list of elements, modify the entire list of elements and do not modify the individual elements of the list.

An expression such as "above" or "on" may include not only the meaning of "immediately on in a contact manner", but also the meaning of "on in a non-contact manner."

Terms such as first, second, and the like may be used to describe various elements, but the elements should not be limited to those terms. These terms are not intended to limit that substances or structures of elements are different.

The singular forms are intended to include the plural forms as well, unless the context clearly indicates otherwise. Assuming that a certain part includes a certain component, the term "including" means that a corresponding component may further include other components unless a specific meaning opposed to the corresponding component is written.

The term used in the embodiments such as "unit" or "module" indicates a unit for processing at least one function or operation, and may be implemented in hardware, software, or in a combination of hardware and software.

The use of "the" and other demonstratives similar thereto may correspond to both a singular form and a plural form.

Steps of a method may be performed in any appropriate order unless there is no explicit mentioning that the steps have to be performed in the order they described. The use of all exemplary terms (e.g., "etc.,", "and (or) the like", and "and so forth") is merely intended to describe technical spirit in detail, and the scope is not necessarily limited by the examples or exemplary terms unless defined by the claims.

Figure 2:
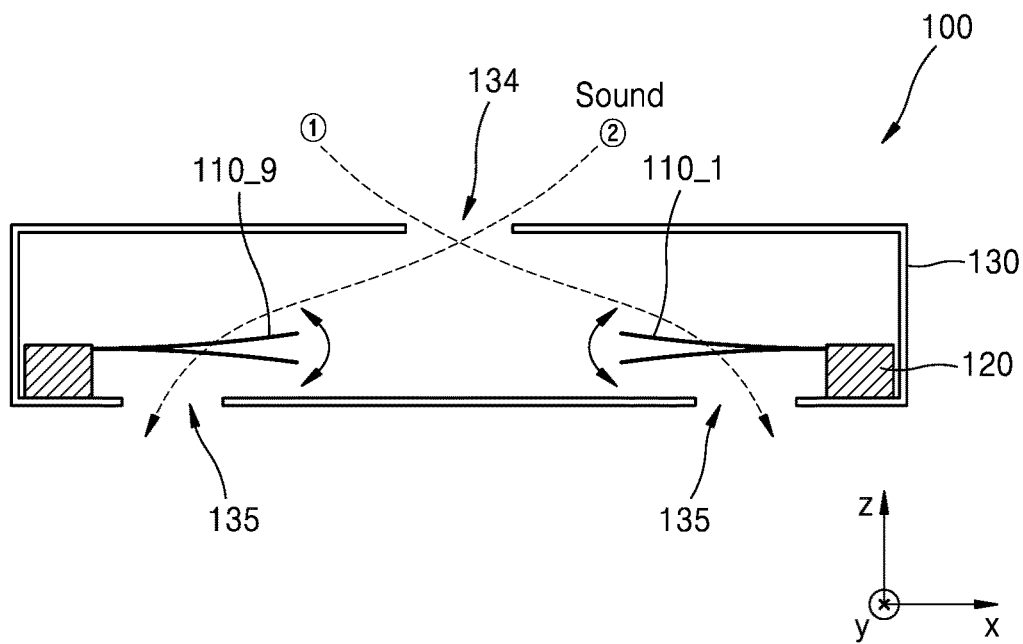
FIG. 2 is a cross-sectional view of the directional acoustic sensor of FIG. 1, cut along a line A-A'.
Figure 3A:
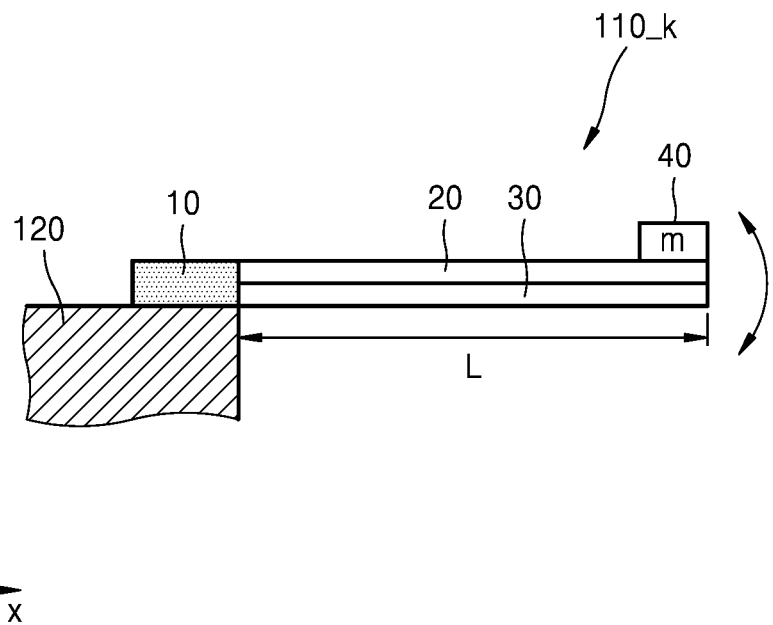
FIGS. 3A and 3B are cross-sectional views showing in detail a structure of a vibration body included in the directional acoustic sensor of FIG. 1 in different cross-sections.
Figure 3B:
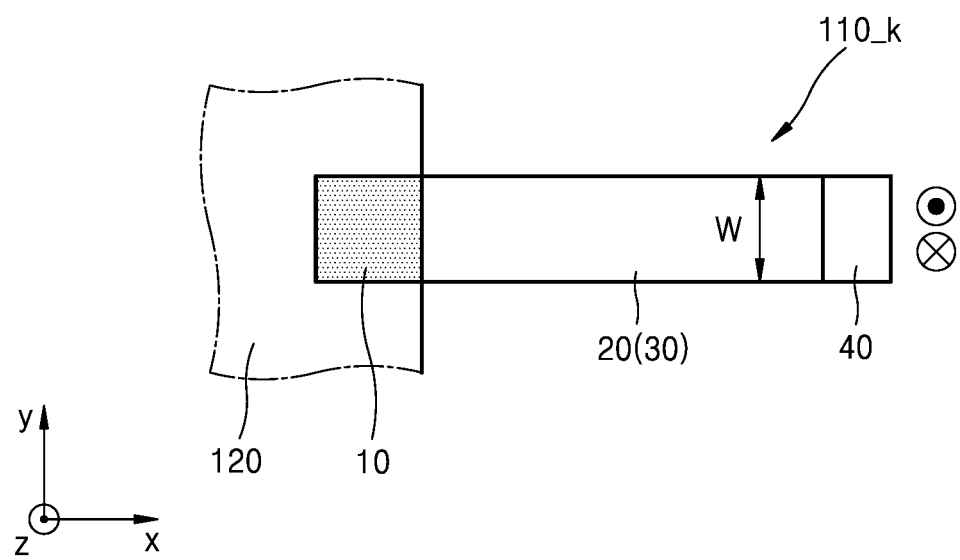

FIG. 1 is a plan view illustrating a structure of a directional acoustic sensor according to an example embodiment, and FIG. 2 is a cross-sectional view of the directional acoustic sensor of FIG. 1, cut along a line A-A'. FIGS. 3A and 3B are cross-sectional views showing in detail a structure of a vibration body included in the directional acoustic sensor of FIG. 1 in different cross-sections.

Referring to FIGS. 1 and 2, a directional acoustic sensor 100 according to an example embodiment may include a sound inlet 134 through which a sound is received, a sound outlet 135 through which the sound received through the sound inlet 134 is output, and a plurality of vibration bodies 110_$k$ arranged between the sound inlet 134 and the sound outlet 135. Herein, when the number of the plurality of vibration bodies 110_$k$ is N, k is an integer from 1 to N.

A physical angular resolution of the directional acoustic sensor 100 may be determined by the number N of vibration bodies 110_$k$. The physical angular resolution may be expressed as 360°/N. The directional acoustic sensor 100 according to an example embodiment may compare a magnitude of an output of each of the plurality of vibration bodies 110_$k$ to detect a direction of a received sound, in which a higher angular resolution may be obtained with more vibration bodies 110_$k$ to be compared in terms of magnitude.

The plurality of vibration bodies 110_$k$ are arranged in such a way that one or more of them react to a received sound selectively according to a direction of a sound received via the sound inlet 134. The plurality of vibration bodies 110_$k$ may be arranged in a form surrounding the sound inlet 134. The plurality of vibration bodies 110_$k$ are arranged in a plane, such that none is superposed onto any other, and all of the plurality of vibration bodies 110_$k$ are exposed to the sound inlet 134. As is shown, the plurality of vibration bodies 110_$k$ may be arranged in a same plane to surround a central point C on the plane, which vertically faces a center of the sound inlet 134. While the plurality of vibration bodies 110_$k$ are illustrated in the drawing as surrounding the central point C in a circular form, this illustration is an example. Arrangement of the plurality of vibration bodies 110_$k$ is not limited to this example, and may have any of various forms having symmetry with respect to the central point C. For example, the plurality of vibration bodies 110_$k$ may be arranged in a polygonal or oval arrangement. Alternately, according to one or more different example embodiments, the vibration bodies may be arranged without symmetry with respect to the central point.

Sound outlets 135 are provided, such that one sound outlet 135 corresponds to each of the plurality of vibration bodies 110_$k$, and are arranged to face the corresponding plurality of vibration bodies 110_$k$.

The size and shape of each of the sound inlets 134 and the sound outlets 135 is not specially limited, as long as the sound inlet 134 and the sound outlets 135 may expose the plurality of vibration bodies 110_$k$ to an identical extent.

To form the sound inlet 134 and the sound outlets 135, a case 130, having openings formed therein corresponding to the shapes of the sound inlet 134 and the sound outlets 135, may be used.

The case 130 may be formed of any of various materials capable of blocking a sound, for example, aluminum. The sound inlet 134 and the sound outlet 135 are not limited to the illustrated shapes.

Inside the case 130, a support 120 may be arranged to support the plurality of vibrations 110_$k$ and to provide a space in which the plurality of vibration bodies 110_$k$ react to a sound and vibrate. The support 120 may be provided by forming a through-hole TH in a substrate as shown in FIG. 1. The plurality of vibration bodies 110_$k$ are arranged in such a way to be supported at ends thereof by the support 120 and to face the through-hole TH. The through-hole TH provides a space in which the plurality of vibration bodies 110_$k$ vibrate by an external force, and a shape or size of the through-hole TH is not specially limited as long as the through-hole TH provides such a space. The support 120 may be formed using any of various materials such as a silicon substrate or the like. As shown in the illustrated example embodiments, the support 120 and the case may be separate elements, for example manufactured by a semiconductor microelectromechanical systems (MEMs) process. Alternately, the support 120 and the case 130 may be fabricated as a single unit.

As shown in FIGS. 3A and 3B, each vibration body 110_$k$ may include a fixed portion 10 fixed on the support 120, a moving portion 30 moving in reaction to a signal, and a sensing portion 20 sensing movement of the moving portion 30. The vibration body 110_k may further include a mass body 40 for providing a mass m to the moving portion 30.

The moving portion 30 may include an elastic film. The elastic film may have a length L and a width W that, together with the mass m of the mass body 40, may be factors that determine resonant characteristics of the vibration body 110_k. The elastic film may include a material such as silicon, metal, polymer, or the like.

The sensing portion 20 may include a sensor layer for sensing movement of the moving portion 30. The sensing portion 20 may include a piezoelectric element, and in this case, may have a stacked structure including an electrode layer, a piezoelectric material layer, and an electrode layer. As a piezoelectric material, for example, zinc oxide (ZnO), tin oxide (SnO), lead zirconate titanate (PZT), zinc stannate (ZnSnO3), polyvinylidene fluoride (PVDF), poly(vinylidene fluoride-trifluoroethylene) P(VDF-TrFE), aluminium nitride (AlN), lead magnesium niobate-lead titanate (PMN-PT), and so forth may be used. For the electrode layer, a metal material or other any of various other conductive materials may be used.

Detailed dimensions such as a width, a thickness, and so forth of each of the plurality of vibration bodies 110_k may be determined based on a desired resonant frequency of each vibration body 110_k. For example, each vibration body 110_k may have, but is not limited to, a width of about several μms to about several hundreds of μms, a thickness of about several μms or less, and a length of about several mms or less. Vibration bodies 110_k having such a minute size may be manufactured by a micro electro mechanical system (MEMS) process.

A vibration body (for example, the vibration body 110_k) vibrates up and down along a direction z in reaction to an external signal, and produces an output proportional to a displacement z, which is the displacement of the vibration body in the z-direction. The displacement z follows the following equation of motion:

$$m\frac{d^2z}{dt^2} + c\frac{dz}{dt} + kz = F_0\cos\omega t$$

where c denotes a damping coefficient, k denotes an elastic coefficient, and $F_0 \cos \omega t$ denotes a driving force and indicates an action by a signal received by the vibration body 110_k. The value k is determined by the physical properties and the shape of the moving portion 30.

The vibration body 110_k shows frequency response characteristics having a specific band width centered at a resonant frequency f0.

The center frequency $f_0$ is given as below.

$$f_0 = \frac{1}{2\pi}\sqrt{\frac{k}{m}}$$

As such, the plurality of vibration bodies 110_k included in the directional acoustic sensor 100 may sense a frequency in a specific band centered at a designed center frequency. Thus, when the center frequency is determined, a frequency band having high availability may be selected for a given environment and the plurality of vibration bodies 110_k having shapes and physical properties suitable for the frequency band may be implemented.

In the directional acoustic sensor 100 according to an example embodiment, the plurality of vibration bodies 110_k provided in respective positions all have a same length and a same resonant frequency. However, the plurality of vibration bodies 110_k may be modified to have different resonant frequencies without being limited to this example.

In the directional acoustic sensor 100 according to an example embodiment, among the plurality of vibration bodies 110_k, one or more vibration bodies 110_k placed on a path along which a directional sound is received vibrate in reaction to the sound. For example, as shown in FIG. 2, when a sound is received along a path (1), a vibration body 110_1 placed on this path 1 and one or more vibration bodies adjacent thereto may vibrate. When a sound is received along a path (2), a vibration body 110_9 placed on this path 2 and one or more vibration bodies adjacent thereto may vibrate. As such, a direction of a received sound may be detected based on a position and an output of the vibration body 110_k selectively reacting to the sound according to the direction of the received sound.

Figure 4:
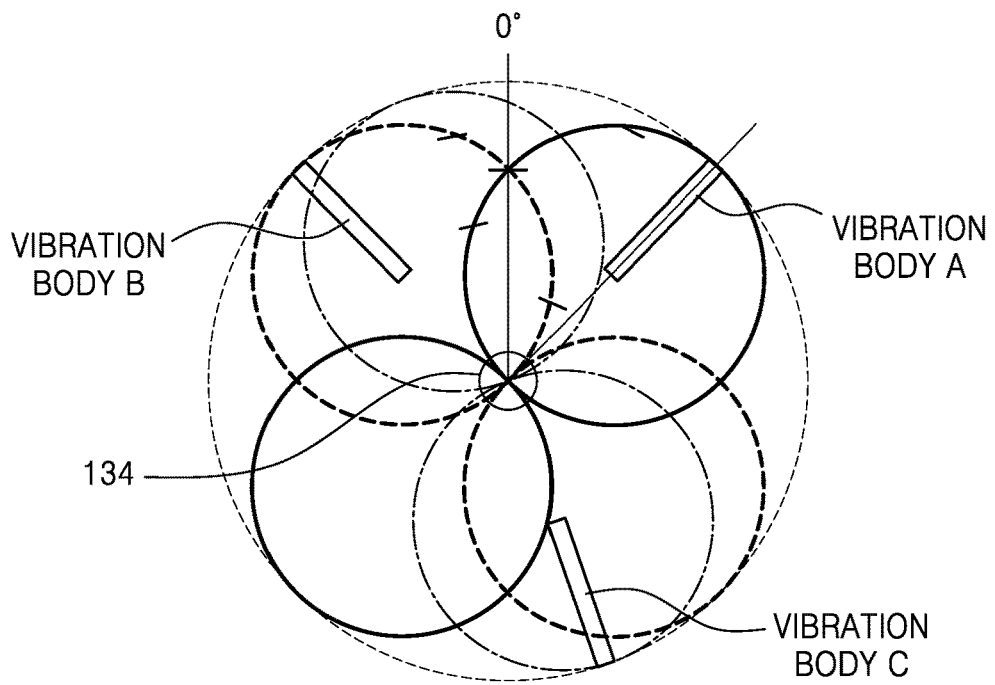
FIG. 4 illustrates some of a plurality of vibration bodies included in the directional acoustic sensor of FIG. 1, showing directional gain curves of vibration bodies.

FIG. 4 illustrates some of a plurality of vibration bodies included in the directional acoustic sensor of FIG. 1, showing directional gain curves.

Referring to FIG. 4, each of a plurality of vibration bodies A, B, and C is an acoustic sensor having a directional angle in a radial direction of a circle centered at the sound inlet 134. A directional gain curve of each acoustic sensor has a figure-eight form. According to such a directional gain curve, the directional acoustic sensor 100 has an output formed by superposition of outputs of the vibration bodies 110_k selectively reacting to signals received along all directions.

Meanwhile, each vibration body 110_k has a preferred angle, which is a principal direction, according to a position in which the vibration body 110_k is arranged, and contributes to a sound in the principal direction to a large degree and contributes to a sound in a direction other than the principal direction to a small degree. Therefore, for any received sound, by simply comparing a magnitude of an output of each of the plurality of vibration bodies 110_k, the direction of the received sound may be estimated, and simultaneous mapping is also possible for a plurality of sound sources that exist nearby. In this way, the directional acoustic sensor 100 may estimate a nearby omni-directional sound source distribution.

Figure 5:
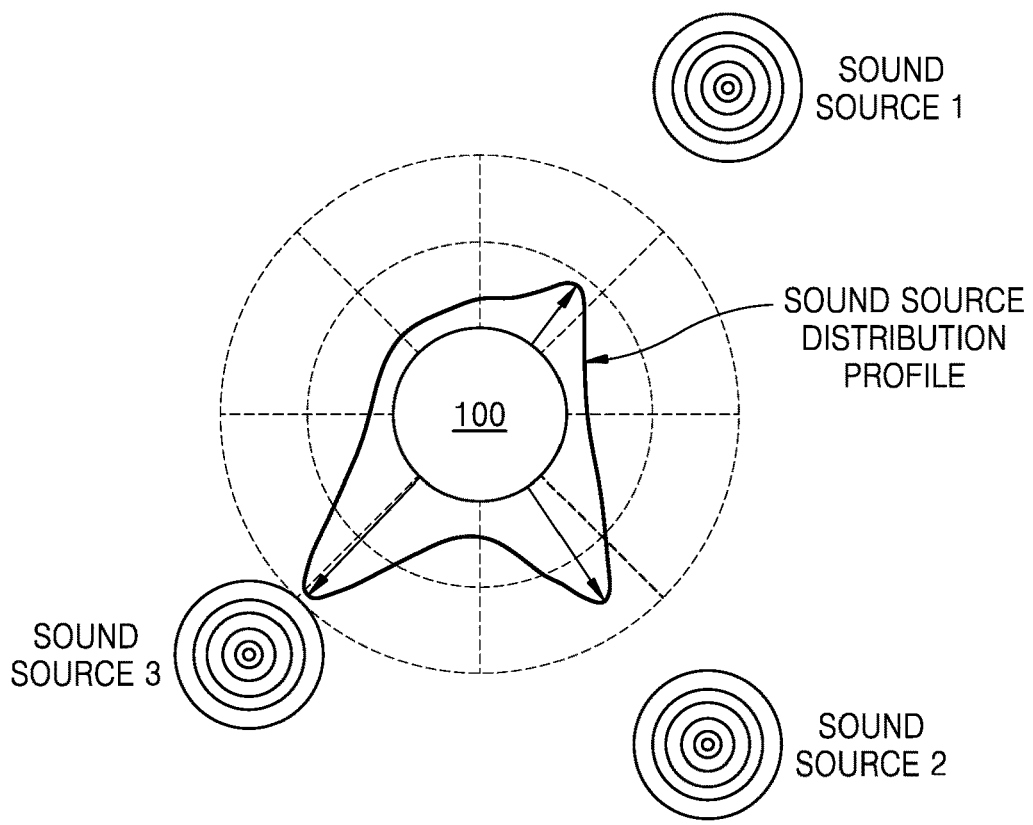
FIG. 5 illustrates a sound source distribution profile sensed by a directional acoustic sensor of FIG. 1 with respect to sound sources located in a plurality of locations.

FIG. 5 illustrates a sound source distribution profile sensed by a directional acoustic sensor of FIG. 1 with respect to sound sources located in a plurality of directions.

A sound source distribution profile may be estimated because, for sound sources 1, 2, and 3 located in three directions, an output of a vibration body having a principal direction directed to each of the sound sources 1, 2, and 3 contributes the most to the detection of sound from that source.

Hereinafter, a description will be made of a method of finding out a sound direction from an output of each of a plurality of vibration bodies included in the directional acoustic sensor 100 with reference to FIGS. 6 to 8.

Figure 6:
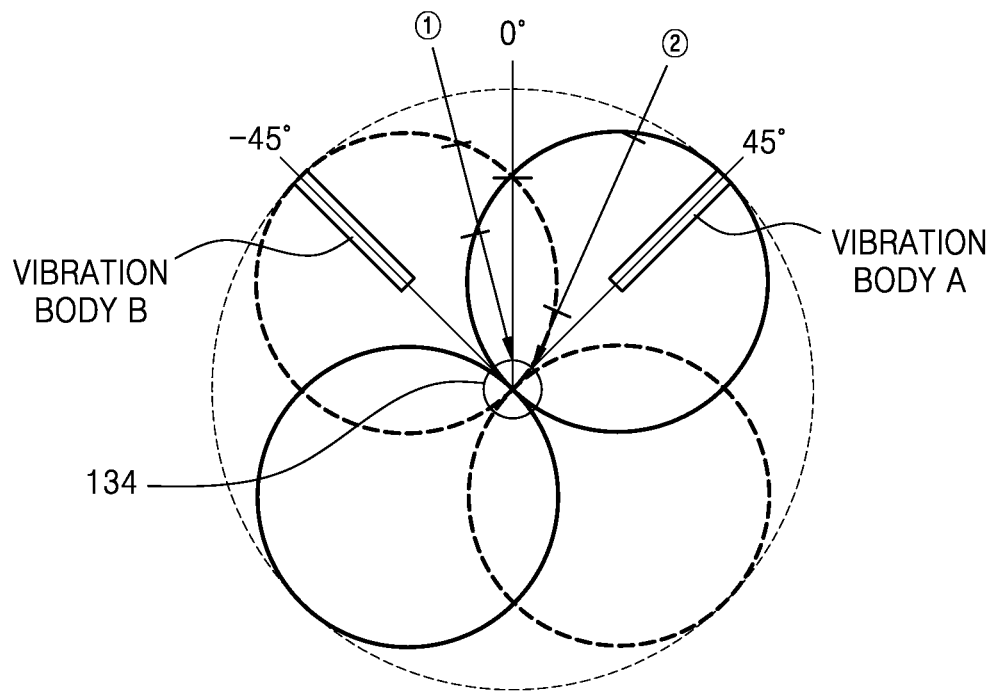
FIG. 6 illustrates two vibration bodies included in the directional acoustic sensor of FIG. 1, showing directional gain curves of the respective vibration bodies in polar coordinates.
Figure 7:
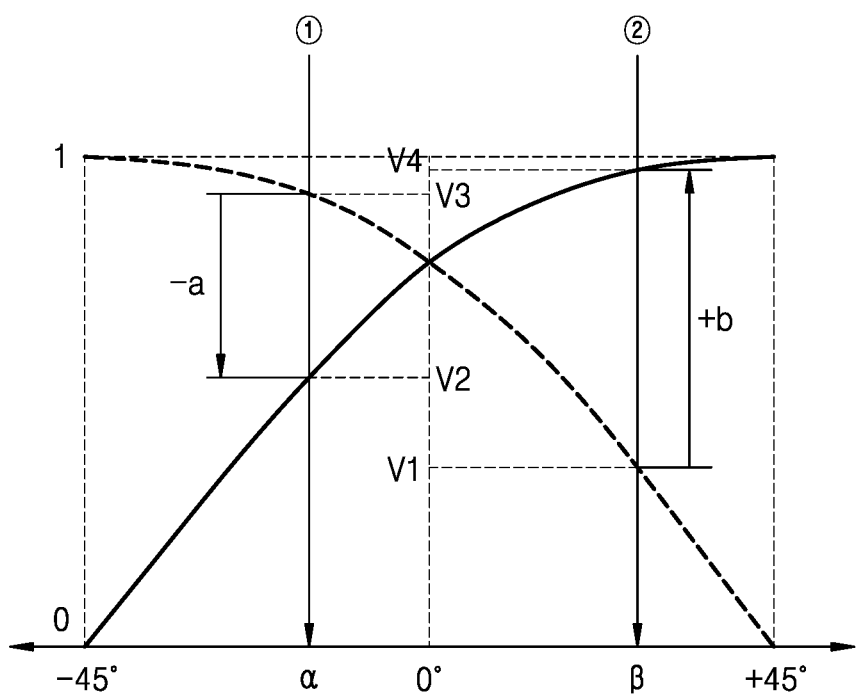
FIG. 7 shows the directional gain curves of FIG. 6 in orthogonal coordinates.
Figure 8:
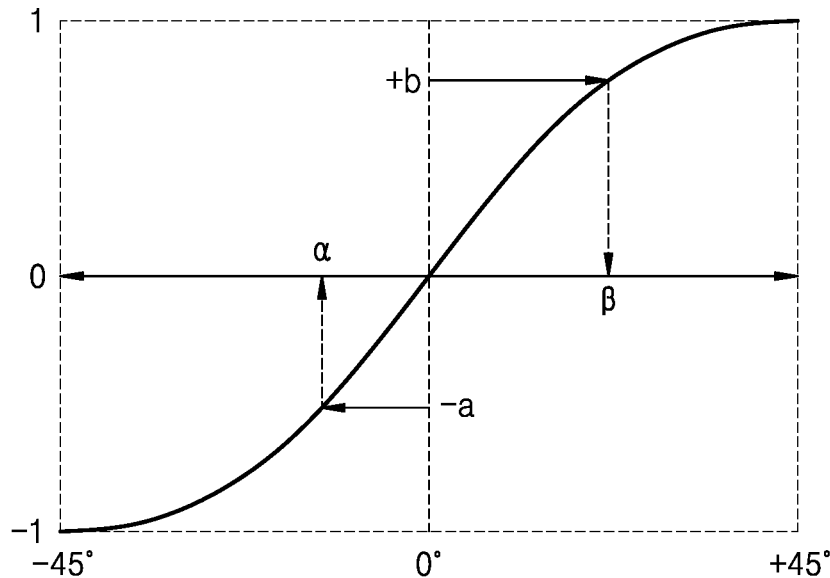
FIG. 8 is a matching graph for estimating a received sound direction that is set from the directional gain curves of FIG. 7.

FIG. 6 illustrates two vibration bodies included in the directional acoustic sensor of FIG. 1, showing directional gain curves of the respective vibration bodies in polar coordinates, FIG. 7 shows the directional gain curves of FIG. 6 in orthogonal coordinates, and FIG. 8 is a matching graph for estimating a received sound direction that is calculated from the directional gain curves of FIG. 7.

Referring to a directional gain curve for a vibration body A, indicated with a solid line, the vibration body A shows a maximum output for a sound in a direction of about +45° and shows a minimum output for a sound in a direction of about −45°.

Referring to a directional gain curve for a vibration body B, indicated with a dotted line, the vibration body B shows a maximum output for a sound in the direction of −45° and shows a minimum output for a sound in the direction of about 45°.

Figure 17:
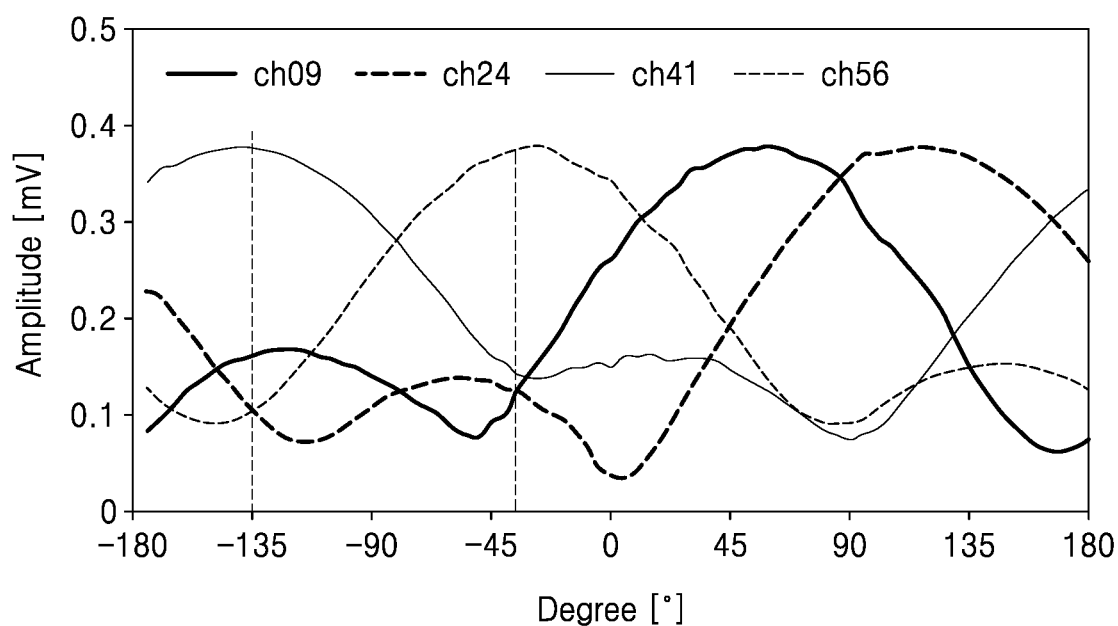
FIG. 17 is an output graph of four vibration bodies according to an example embodiment with respect to a change in a direction of a sound source.

Referring to FIG. 7, when the output of the vibration body A and the output of the vibration body B are equal to each other, a direction of the sound is about 0°. Alternately, the direction of the sound may be about 180°. However, as shown in FIG. 17, discussed below, the gain when the direction of sound is 0° may be slightly different from the gain when the direction of sound is 1800. When the output of the vibration body A is greater that of the vibration body B, the direction of the sound is greater than about 0°; when the output of the vibration body A is less than that of the vibration body B, the direction of the sound is less than about 0°. When the output of the vibration body A is less than that of the vibration body B is, a difference between the outputs is indicated by a negative (minus) sign; when the output of the vibration body A is greater than that of the vibration body B, the difference is indicated by a positive (plus) sign, in which the negative sign and the positive sign correspond to a negative angle and a positive angle, respectively.

For a sound received in a direction ①, an output V3 of the vibration body B is greater than an output V2 of the vibration body A. When the direction ① is an angle α, an output difference −a between the two vibration bodies A and B, indicated by the negative sign, and the angle α one-to-one match each other.

For a sound received in a direction ②, an output V4 of the vibration body A is greater than an output V1 of the vibration body B. When the direction is an angle β, an output difference +b between the two vibration bodies A and B, indicated by the positive sign, and the angle β one-to-one match each other.

In this way, for a sound received in a direction between the position of the vibration body A and the position of the vibration body B, values indicating (the output of the vibration body A—the output of the vibration body B) one-to-one match angles between about −45° and about 45°.

FIG. 8 is a graph indicating such matching in which a vertical axis indicates the output of the vibration body A—the output of the vibration body B. Once the matching graph is set, for a sound received in a direction between the position of the vibration body A and the position of the vibration body B, the output of the vibration body A—the output of the vibration body B is calculated to find out a direction of the received sound.

The matching graph shows a relationship between an output difference between two vibration bodies in arbitrary positions and a direction of a received sound, and a plurality of matching graphs may be set, by using which a direction of a sound received from an arbitrary direction may be found.

Figure 9:
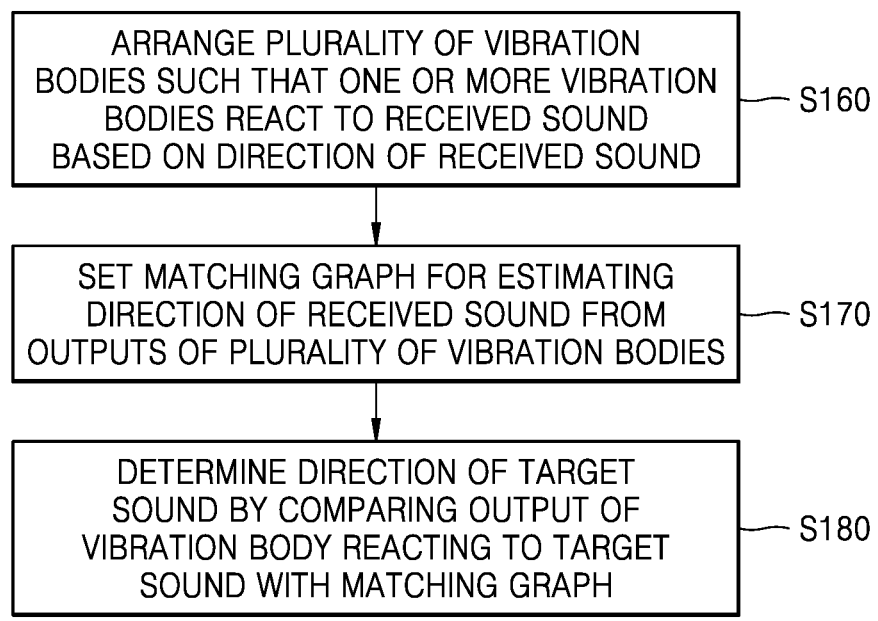
FIG. 9 is a flowchart schematically illustrating a method of detecting a direction of sound, according to an example embodiment.

FIG. 9 is a flowchart schematically illustrating a method of detecting a direction of sound according to an example embodiment.

First, a vibration body array including a plurality of vibration bodies arranged such that one or more of the plurality of vibration bodies react to a received sound selectively according to a direction of the received sound is provided in operation S160.

The vibration array may be configured as described with reference to FIG. 1. However, without being limited to such a configuration, any of various configurations may be used in which a plurality of vibration bodies are arranged such that one or more of a plurality of vibration bodies react to a received sound depending on a direction of the received sound. A directional acoustic sensor according to various embodiments to be described with reference to FIG. 10 may also be used.

Next, for the provided vibration body array, a matching graph for estimating a direction of a received sound based on an output of each of the plurality of vibration bodies is set in operation S170.

To set the matching graph, the method described above with reference to FIGS. 6 to 8 may be used. A plurality of matching graphs indicating a relationship between an amplitude difference between two arbitrary vibration bodies included in the vibration body array and a direction of a received sound may be set.

Once the matching graphs is set and a target sound, which is a target for direction detection, is received, an amplitude of one or more vibration bodies reacting to the received target sound and the matching graph are compared with each other, thus determining a direction of the target sound in operation S180.

Figure 10:
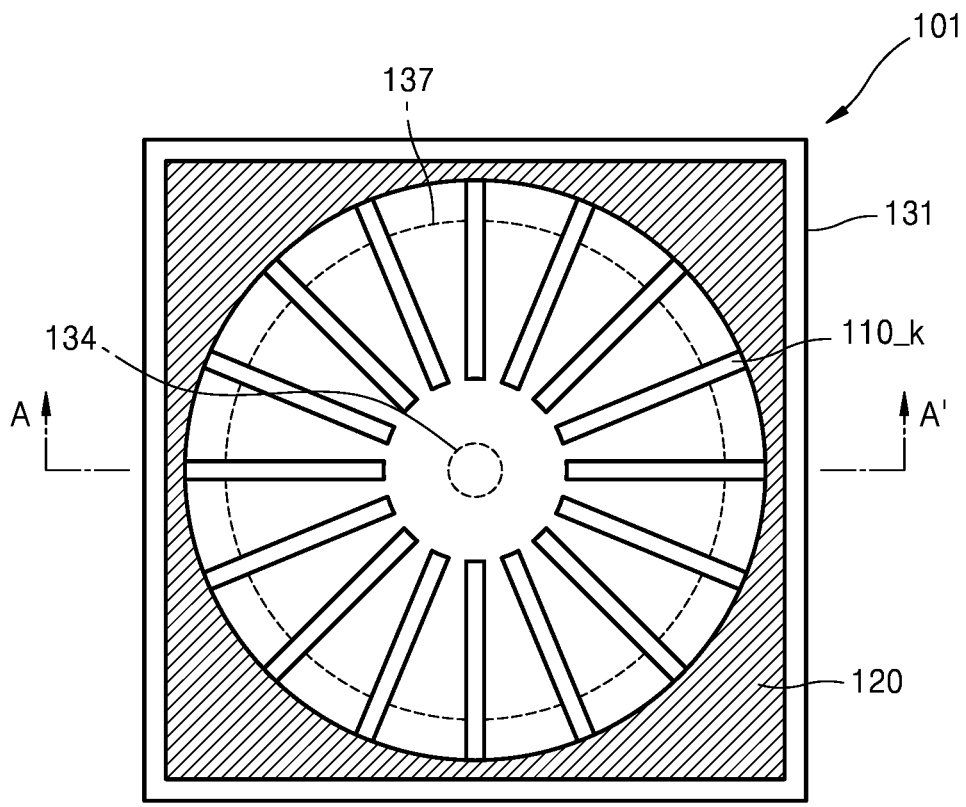
FIG. 10 is a plan view illustrating a schematic structure of a directional acoustic sensor according to another example embodiment.
Figure 11:
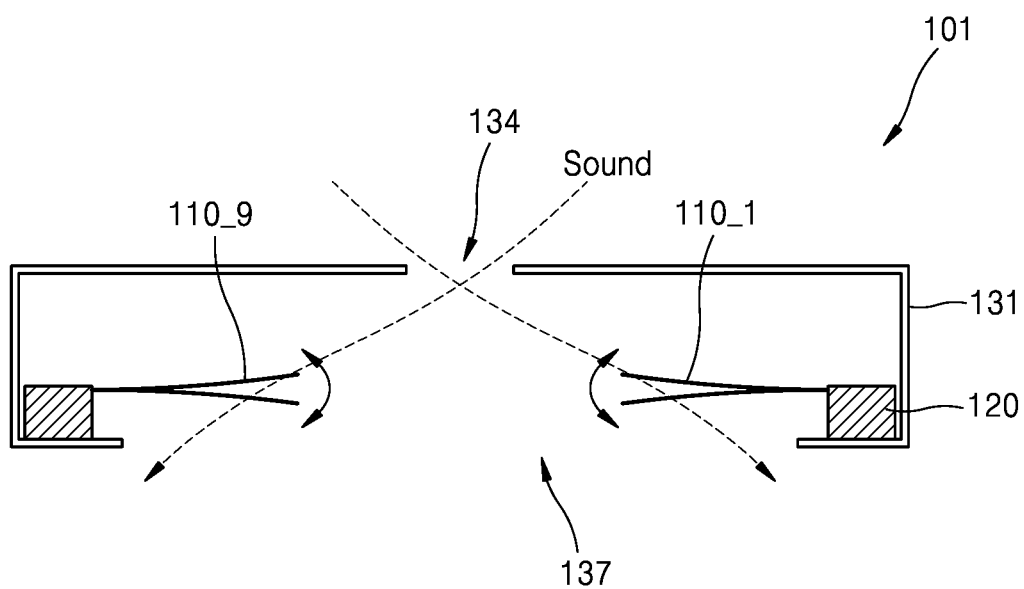
FIG. 11 is a cross-sectional view of the directional acoustic sensor of FIG. 10, cut along a line A-A'.

FIG. 10 is a plan view illustrating a structure of a directional acoustic sensor according to another example embodiment, and FIG. 11 is a cross-sectional view of the directional acoustic sensor of FIG. 10, cut along a line A-A'.

A directional acoustic sensor 101 may include the sound inlet 134 through which a sound is received, the sound outlet 137 through which the sound received through the sound inlet 134 is output, and the plurality of vibration bodies 110_k arranged between the sound inlet 134 and the sound outlet 137. Herein, when the number of the plurality of vibration bodies 110_k is N, k is an integer from 1 to N.

The directional acoustic sensor 101 according to the current example embodiment is different from the directional acoustic sensor 100 with respect to the shape of the sound outlet 137, and the other elements of the directional acoustic sensor 101 are substantially the same as those of the directional acoustic sensor 100.

The sound outlet 137 is not separately provided for each of the plurality of vibration bodies 110_k; instead, one sound outlet 137 is shared among the plurality of vibration bodies 110_k. The sound outlet 137 faces all of the plurality of vibration bodies 110_k, and an illustrated size thereof is an example and the size of the sound outlet 137 may be smaller than the illustration.

To form the sound inlet 134 and the sound outlet 137, a case 131 having formed therein openings corresponding to the shapes of the sound inlet 134 and the sound outlet 137 may be used.

The size of the sound outlet 137 may not be specified. For example, a space opposite to the sound inlet 134 with respect to the plurality of vibration bodies 110_k, may be entirely open. The space that is open in this way may function as the sound outlet 137.

Hereinafter, referring to FIGS. 12 through 20, performance of a directional acoustic sensor according to an example embodiment will be described.

Figure 12:
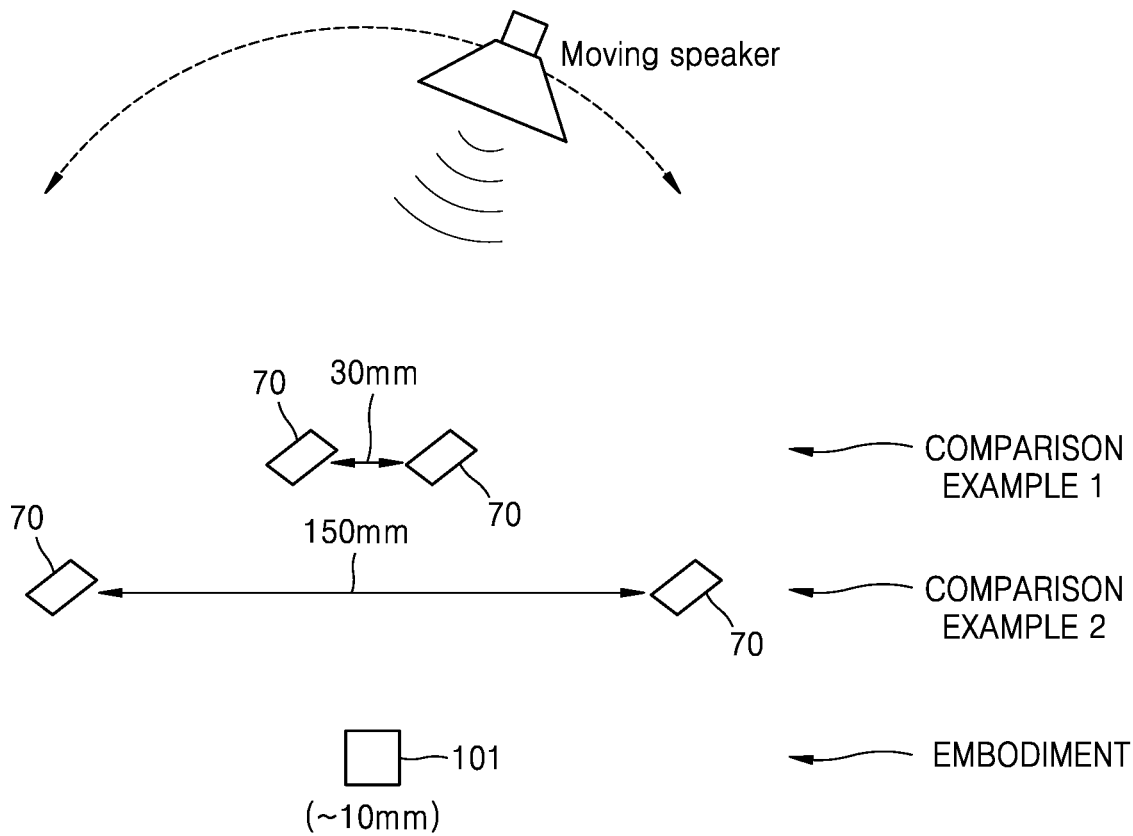
FIG. 12 shows an experimental set-up for comparing a directional acoustic sensor according to an example embodiment with a directional acoustic sensor according to a comparative example in terms of performance.

FIG. 12 shows an experimental set-up for comparing a directional acoustic sensor according to an example embodiment with a directional acoustic sensor according to a comparative example in terms of performance.

A directional acoustic sensor according to a comparative example 1 includes two microphones 70 spaced apart from each other by a distance of 30 mm, and a directional acoustic sensor according to a comparative example 2 includes two microphones 70 spaced apart from each other by a distance of 150 mm.

The directional acoustic sensor according to an example embodiment is the directional acoustic sensor 101 as described with reference to FIG. 10, and has an overall size of about 10 mm.

By using a moving speaker as a directional sound source, an output received by each directional acoustic sensor has been observed with respect to an angle of the speaker.

Figure 13:
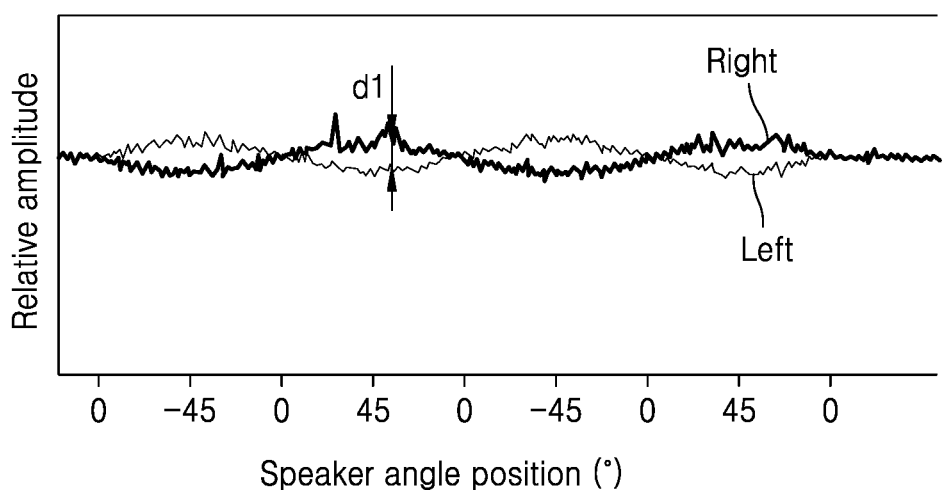
FIG. 13 is an output graph of two microphones according to a comparative example 1 with respect to a change in a direction of a sound source.
Figure 14:
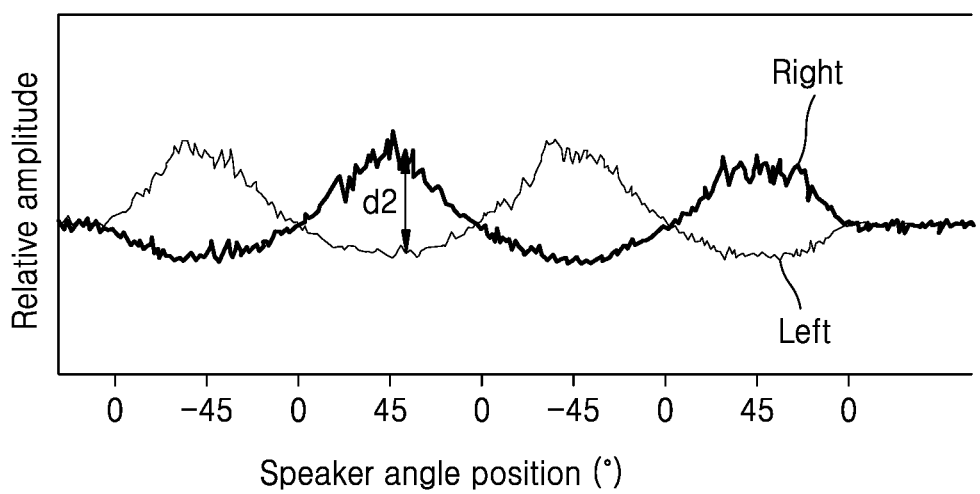
FIG. 14 is an output graph of two microphones according to a comparative example 2 with respect to a change in a direction of a sound source.
Figure 15:
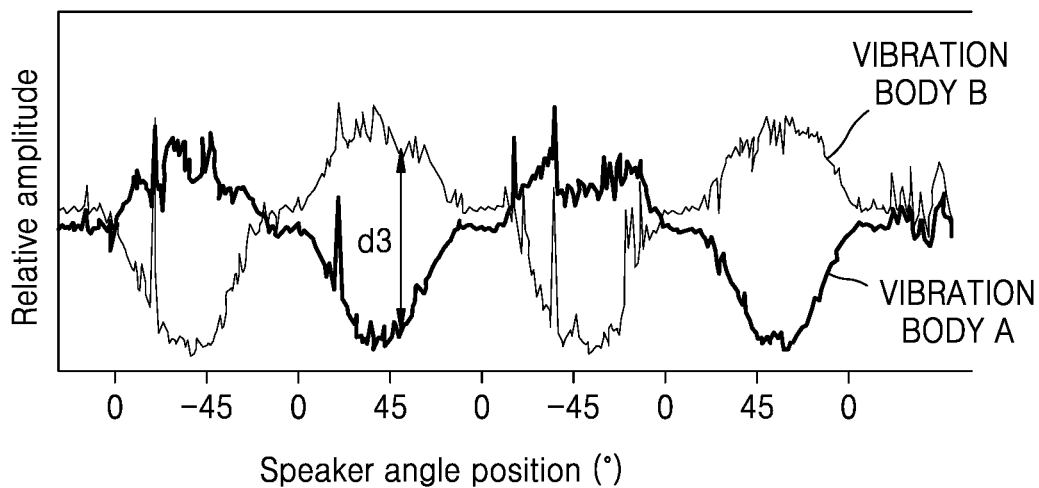
FIG. 15 is an output graph of two vibration bodies according to an example embodiment with respect to a change in a direction of a sound source.

FIG. 13 is an output graph of two microphones according to the comparative example 1 with respect to a change in a direction of a sound source, FIG. 14 is an output graph of two microphones according to the comparative example 2 with respect to a change in a direction of a sound source, and FIG. 15 is an output graph of two vibration bodies according to an example embodiment with respect to a change in a direction of a sound source.

The directional acoustic sensors according to the comparative examples using the two microphones spaced apart from each other calculate a direction of a received sound by using a time difference of a sound arriving at each microphone. In this case, as a distance between the two microphones is longer, it becomes easier to detect the time difference and directional sensing sensitivity improves.

In the graphs shown in FIGS. 13 and 14, d1 and d2 indicate maximum/minimum output differences between the two microphones included in the directional acoustic sensors according to the comparative examples 1 and 2, respectively. In the graph shown in FIG. 15, d3 indicates a maximum/minimum output difference between the two microphones included in the directional acoustic sensor according to an example embodiment.

In the comparative example 2 in which the distance between the two microphones is longer, a high contrast and a high direction sensing sensitivity are exhibited. In the directional acoustic sensor according to the example embodiment, a higher contrast than that of the comparative example 2 is exhibited. Such a result indicates that even when the directional acoustic sensor according to the example embodiment has a much smaller size of 10 mm than that of the directional acoustic sensor according to the comparative example 2, the directional acoustic sensor according to the example embodiment provides a higher sensing sensitivity than the directional acoustic sensor according to the comparative example 2.

Figure 16:
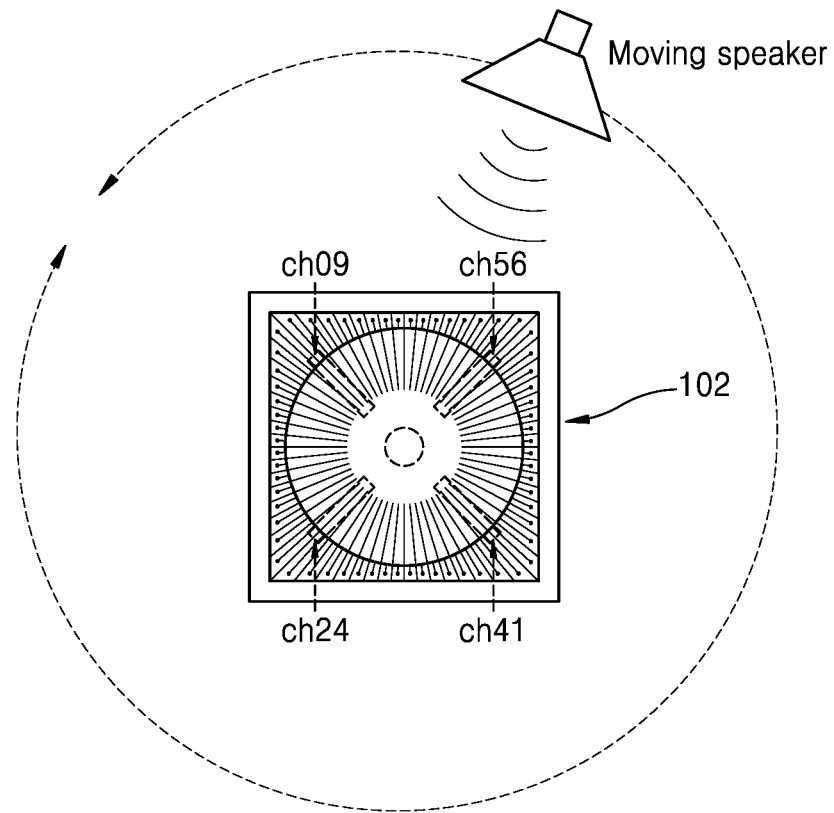
FIG. 16 shows an experimental set-up for testing whether a directional acoustic sensor according to an example embodiment may estimate a sound.

FIG. 16 shows an experimental set-up for testing that a directional acoustic sensor according to an example embodiment may estimate the location of a sound.

A directional acoustic sensor 102 according to an example embodiment includes 64 vibration bodies, thus forming 64 channels. A moving speaker, used as a directional sound source, is rotated 360° around the directional acoustic sensor 102, and among the 64 channels, four channels ch09, ch24, ch41, and ch56 are selected to observe outputs.

FIG. 17 is an output graph of four vibration bodies according to an example embodiment with respect to a change in a direction of a sound source.

According to the example embodiments of FIG. 16, channel ch09 is oriented at 45°, channel ch24 is oriented at 135°, channel ch41 is oriented at −135°, and channel ch56 is oriented at −45°. It can be seen that vibration bodies forming the four selected channels globally form maximum outputs when an incident angle of a sound corresponds to a principal axis of a corresponding vibration body. In this regard, even when only four vibration bodies are used, omnidirectional sound direction estimation may be possible.

Figure 18:
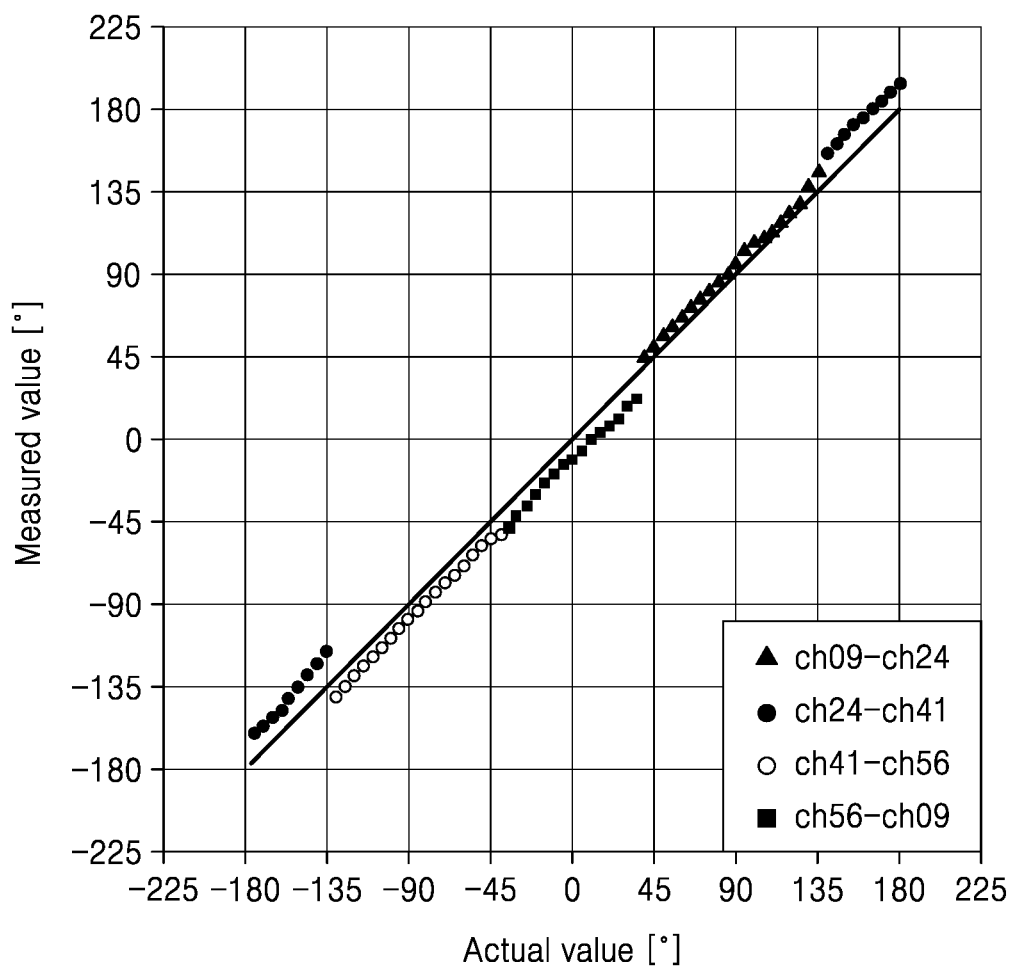
FIG. 18 is a graph comparing a sound direction estimated based on outputs from a plurality of vibration bodies included in a directional acoustic sensor according to an example embodiment with an actual sound direction.

FIG. 18 is a graph comparing a sound direction estimated based on outputs from a plurality of vibration bodies included in a directional acoustic sensor according to an example embodiment with an actual sound direction.

In the graph, a channel-specific mark includes a measured value, which indicates a principal axis of a vibration body corresponding to a channel showing a maximum output among 64 channels, along a vertical axis, and an actual value, which indicates a received direction of a sound, along a horizontal axis.

A solid line is a straight line matching measured values with actual values, and channel-specific marks are nearly matched with the straight line. In this regard, it can be seen that the directional acoustic sensor implemented with 64 channels according to an example embodiment almost 100% accurately estimates a direction of a sound received from every direction.

Figure 19:
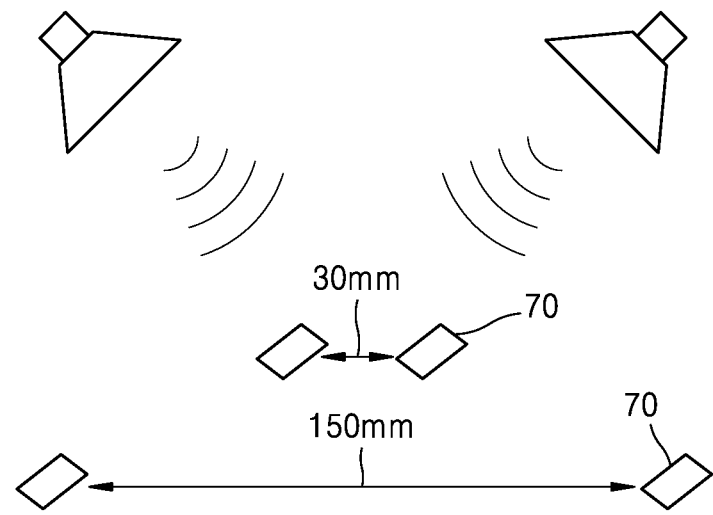
FIG. 19 shows another experimental set-up for comparing a directional acoustic sensor according to an example embodiment with a directional acoustic sensor according to a comparative example in terms of performance.
Figure 20:
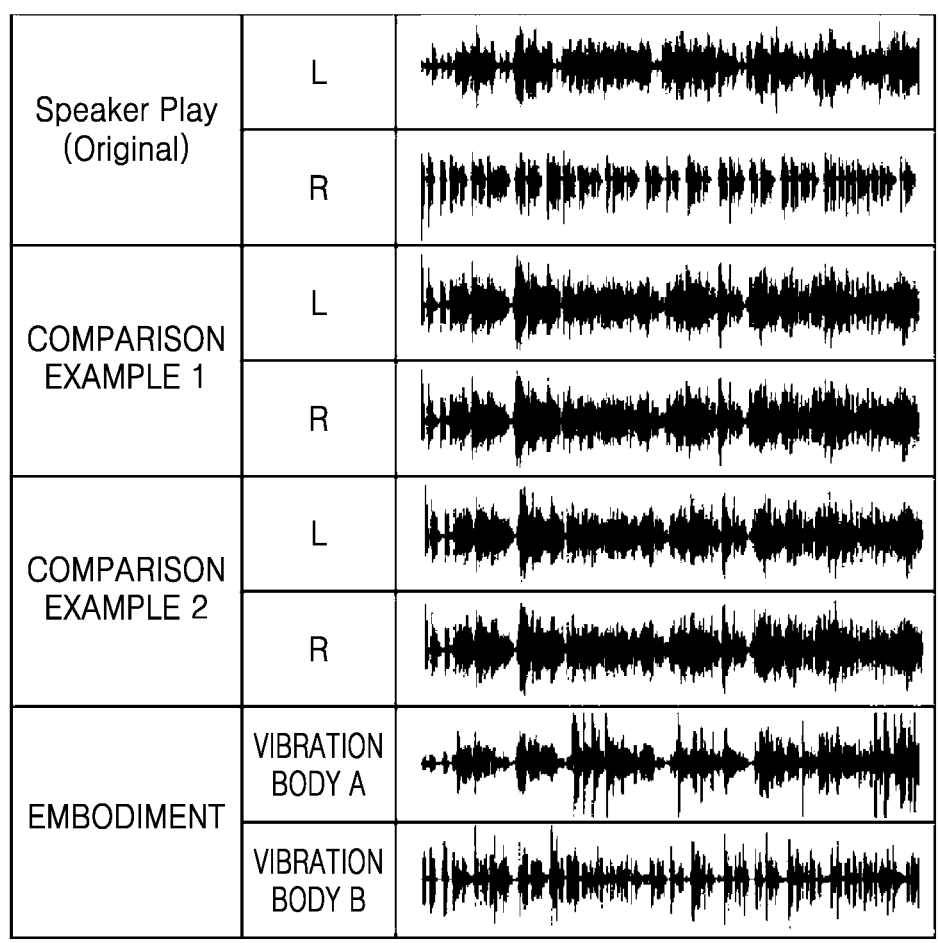
FIG. 20 is a view comparing a sound signal, which is sensed by a directional acoustic sensor according to an example embodiment, and a sound signal, which is sensed by a directional acoustic sensor according to a comparative example, with a sound signal from a sound source.

FIG. 19 shows another experimental set-up for comparing a directional acoustic sensor according to an example embodiment with a directional acoustic sensor according to a comparative example in terms of performance, and FIG. 20 is a view comparing a sound signal, which is sensed by a directional acoustic sensor according to an example embodiment, and a sound signal, which is sensed by a directional acoustic sensor according to a comparative example, with a sound signal from a sound source.

A directional acoustic sensor according to a comparative example 1 includes two microphones 70 spaced apart from each other by a distance of 30 mm, and a directional acoustic sensor according to a comparative example 2 includes two microphones 70 spaced apart from each other by a distance of 150 mm.

The directional acoustic sensor according to an example embodiment is the directional acoustic sensor 101 as described with reference to FIG. 10, and has an overall size of about 10 mm.

As a test of a case in which different types of sound sources are received in different directions, a left speaker outputs music and a right speaker outputs voice.

In this way, when different types of sounds are received by directional acoustic sensors from different directions, the output received by each directional acoustic sensor has been observed.

Referring to FIG. 20, in the directional acoustic sensors according to the comparative examples 1 and 2, sounds from two directions are mixed such that directions of different sound sources are difficult to distinguish from each other.

On the other hand, in the directional acoustic sensor according to an example embodiment, outputs corresponding to different types of sound sources are shown in two vibration bodies A and B located in different directions. In this regard, it can be seen that when a different type of a sound is received from a different direction, the directional acoustic sensor according to an example embodiment may be used as an element that separates and records the received sound.

Figure 21:
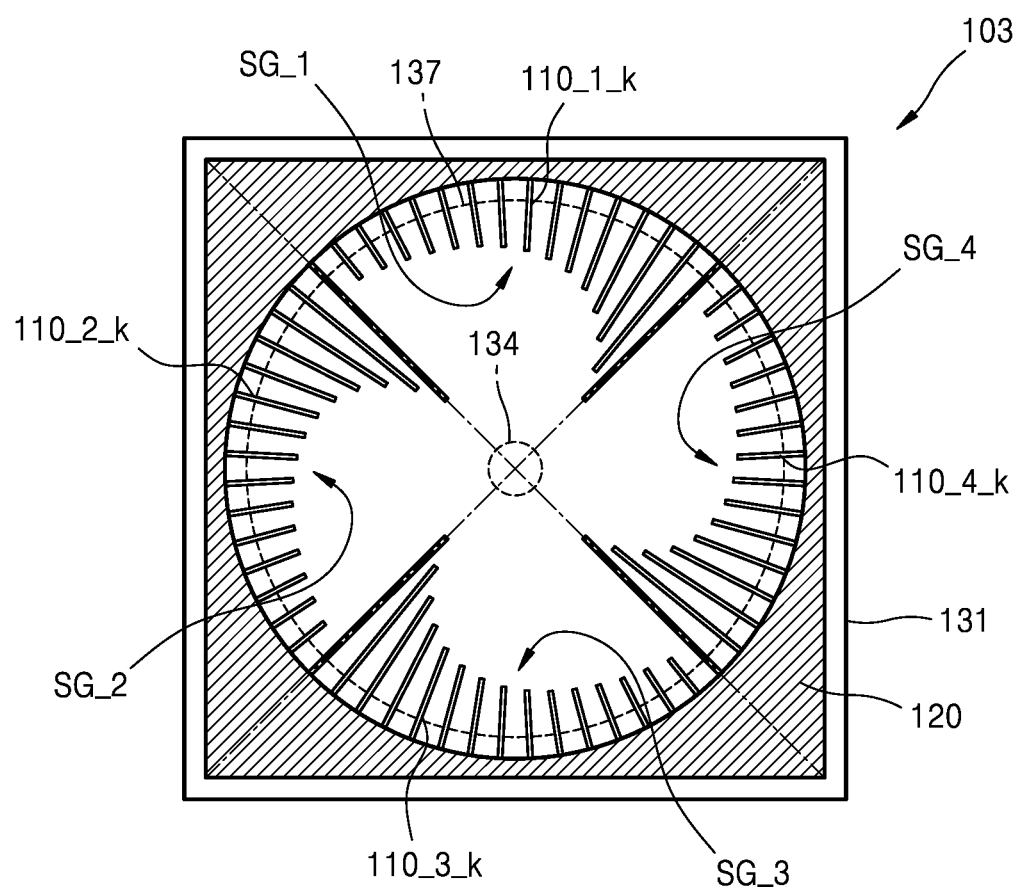
FIG. 21 is a plan view illustrating a schematic structure of a directional acoustic sensor according to another example embodiment.

FIG. 21 is a plan view illustrating a schematic structure of a directional acoustic sensor according to another example embodiment.

A directional acoustic sensor 103 may include a plurality of sub groups SG_1, SG_2, SG_3, and SG_4. The plurality of sub groups SG_1, SG_2, SG_3, and SG_4 may be formed by grouping vibration bodies having adjacent directions into a predetermined number of vibration bodies to represent different directions. For example, first through fourth sub groups SG_1, SG_2, SG_3, and SG_4 may represent directions, every two adjacent directions of which have a difference of about 90°.

The directional acoustic sensor 103 according to the current example embodiment is different from the above-described embodiments in that the directional acoustic sensor 103 includes vibration bodies 110_1_k, 110_2_k, 110_3_k, and 110_4_k having different resonant frequencies. For example, instead that the 64 vibration bodies have the same one resonant frequency as shown in FIG. 16, 64 vibration bodies are grouped into subgroups to have frequencies in a specific range by the change of lengths thereof, such that signals of vibration bodies in one group are integrated and used. As is shown, the directional acoustic sensor 103 is implemented as a device having four subgroups, such that the directional acoustic sensor 103 has four physical directions instead of 64 directions, and a frequency band in each group is expanded to the entire audible band instead of a single resonant band.

Hereinafter, a description will be made focusing on a difference.

The first subgroup SG_1 includes a plurality of vibration bodies 110_1_k arranged along a circumference in a range of a central angle of about 900, the second subgroup SG_2 includes a plurality of vibration bodies 110_2_k arranged along a circumference in a next range of the central angle of about 90°, the third subgroup SG_3 includes a plurality of vibration bodies 110_3_k arranged along a circumference in a next range of the central angle of about 90°, and the fourth subgroup SG_4 includes a plurality of vibration bodies 110_4_k arranged along a circumference in a next range of the central angle of 90°.

For vibration bodies 110_i_k (k is an integer from 1 to N) included in an $i^{th}$ subgroup SG_i (i is an integer from 1 to 4), resonant frequencies thereof are set such that a sound in a predetermined frequency range Δf is sensed. A resonant frequency interval between adjacent vibration bodies 110_i_k may be set based on the number of vibration bodies 110_i_k included in the $i^{th}$ subgroup SG_i, N, and the frequency range Δf.

The plurality of vibration bodies 110_i_k included in each subgroup SG_i may be arranged in an ascending order of a magnitude of a resonant frequency. A direction in which the arrangement is made in the order of the magnitude may be identical over the plurality of subgroups SG_i. For example, as is shown, in each subgroup SG_i, the vibration bodies 110_i_k may be arranged in an order that lengths of the vibration bodies 110_i_k gradually increase in a clockwise direction. However, without being limited to this example, the vibration bodies 110_i_k may be arranged in an order that the lengths of the vibration bodies 110_i_k gradually increase in the counterclockwise direction, or the vibration bodies 110_i_k may be arranged in the clockwise direction in some subgroups SG_i and in the counterclockwise direction in other subgroups SG_j (j≠i).

As described above, it has already been confirmed through the experiment shown in FIGS. 16 and 17 that relatively accurate direction sensing is possible with four vibration bodies arranged to distinguish all directions as four directions, and considering this point, the directional acoustic sensor 103 according to the current embodiment may detect well a direction of a received sounds, and by using the plurality of vibration bodies 110_i_k having various resonant frequencies, a signal in a broader band may be detected than with the directional acoustic sensors 100, 101, and 102 including the vibration bodies 110_k having the same resonant frequency.

Figure 22:
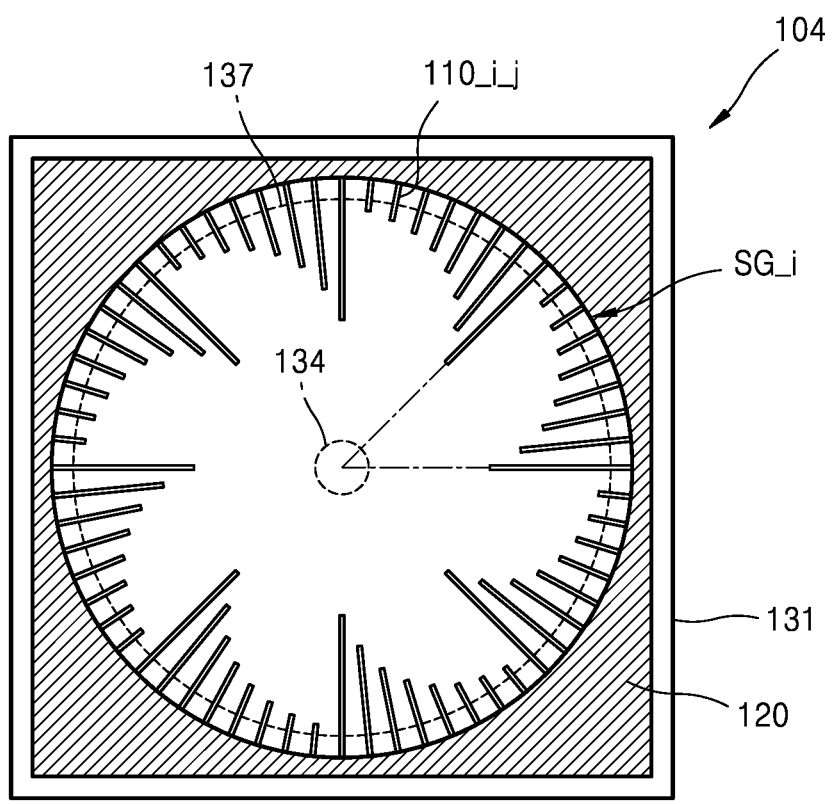
FIG. 22 is a plan view illustrating a schematic structure of a directional acoustic sensor according to another example embodiment.

FIG. 22 is a plan view illustrating a schematic structure of a directional acoustic sensor according to another example embodiment.

A directional acoustic sensor 104 is different from the directional acoustic sensor 103 of FIG. 21 in that vibration bodies are grouped into 8 groups, and the other elements of the directional acoustic sensor 104 are substantially the same as those of the directional acoustic sensor 103.

The directional acoustic sensor 104 is configured such that 8 subgroups SG_i (i is an integer from 1 to 8) represent directions, of which every two adjacent directions have a difference of about 45°. In each subgroup SG_i, vibration bodies 110_i_j having different resonant frequencies are arranged.

Such a directional acoustic sensor 104 has a higher angular resolution, but a narrower sensible frequency bandwidth, than those of the directional acoustic sensor 103 of FIG. 21. In this regard, the number of subgroups may be set suitably for an environment in which a directional acoustic sensor is to be used.

Figure 23:
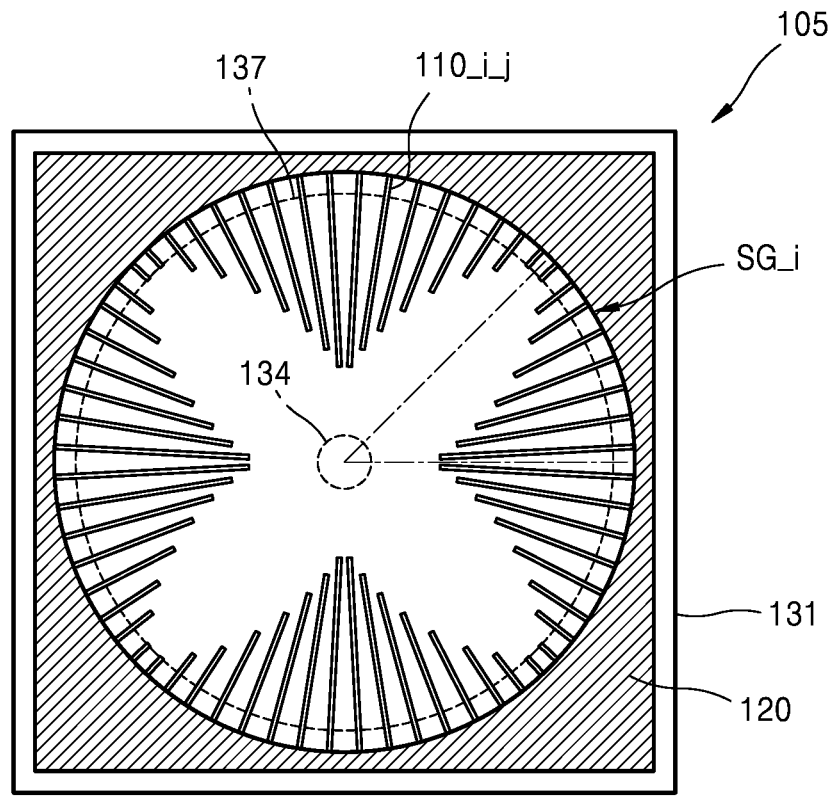
FIG. 23 is a plan view illustrating a schematic structure of a directional acoustic sensor according to another example embodiment.

FIG. 23 is a plan view illustrating a schematic structure of a directional acoustic sensor according to another example embodiment.

A directional acoustic sensor 105 according to the current embodiment is different from the directional acoustic sensor 104 of FIG. 22 in that a plurality of vibration bodies 110_i_j in adjacent subgroups SG_i (i is an integer from 1 to 8) are arranged in a descending order of a magnitude of a resonant frequency. That is, in some subgroups, for example, subgroups SG_1, SG_3, SG_5, and SG_7, the vibration bodies 110_i_j may be arranged in an order that the lengths of the vibration bodies 110_i_j increase in the clockwise direction, and in the other subgroups SG_2, SG_4, SG_6, and SG_8, the vibration bodies 110_i_j may be arranged in an order that the lengths of the vibration bodies 110_i_j increase in the counterclockwise direction.

In the description of the directional acoustic sensors 103, 104, and 105 including vibration bodies having different resonant frequencies, several examples of vibration body arrangement have been described, but the vibration body arrangement is not limited to these examples. In each subgroup, an arrangement interval between vibration bodies, for example, a frequency interval or a space interval may not be identical, and, for example, various arrangement schemes considering coupling between adjacent vibration bodies may be applied.

The directional acoustic sensors according to the foregoing embodiments may be employed in various electronic devices. A directional acoustic sensor may be implemented as a sensor in the form of a chip solution, may perform sound source tracking, noise cancellation, spatial recording, or the like, in the field of a mobile device, an Internet technology (IT) appliance, a vehicle, or the like, and may also be applied in the field of panorama photographing, augmented reality, virtual reality, and the like.

The directional acoustic sensors according to the example embodiments of FIGS. 21, 22, and 23 each include vibration bodies of different lengths with different respective resonant frequencies. Alternately, the vibration bodies of a directional acoustic sensor may have different thicknesses, widths, or weights, thereby implementing vibration bodies with different respective resonant frequencies. Furthermore, according to the illustrated example embodiments, the vibration bodies are arranged to be polar symmetric. However, the vibration bodies may alternately be arranged non-symmetrically, for example in order to be weighted toward a specific direction.

A description will be made of electronic devices using a directional acoustic sensor according to an example embodiment.

Figure 24:
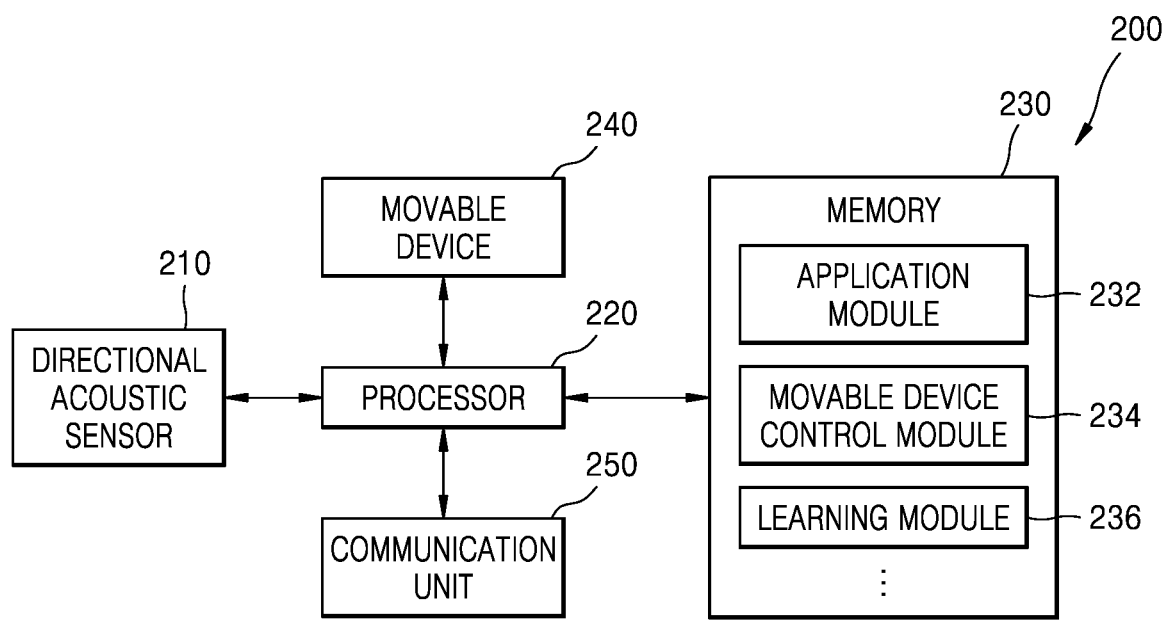
FIG. 24 is a block diagram illustrating a schematic structure of an Internet of Things (IoT) device according to an example embodiment.
Figure 25:
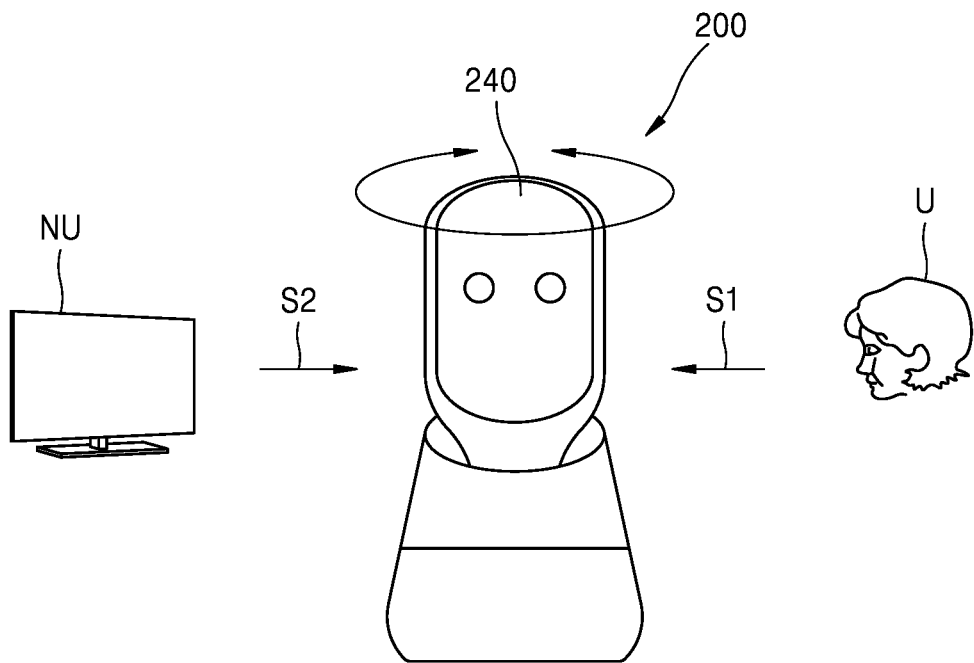
FIG. 25 illustrates an operation in which the IoT device of FIG. 23 is applied to daily life.

FIG. 24 is a block diagram illustrating a schematic structure of an Internet of Things (IoT) device according to an example embodiment, and FIG. 25 illustrates an operation in which the IoT device of FIG. 23 is applied to daily life.

An IoT device 200 may include a directional acoustic sensor 210 that receives a voice signal provided by a user, a memory 230 in which one or more application modules 232 using a received signal as an input variable are stored, and a processor 220 that executes the application modules 232. The IoT device 200 may further include a communication unit 250.

The IoT device 200 may further include a movable device 240 capable of rotating or moving. The movable device 240 may be controlled in terms of rotation or movement in a specific direction based on an execution result of the application modules 232 executed using the signal received by the directional acoustic sensor 210 as an input variable. The direction of the rotation or movement may be a direction directed toward or away from the direction of the sound sensed by the directional acoustic sensor 210. The movable device 240 may be implemented to have an output function capable of outputting, to the user, the execution result of the application modules 232. The movable device 240 may be an output device, for example, a speaker or display.

The directional acoustic sensor 210 may be any one of the directional acoustic sensors 100, 101, 102, 103, 104, and 105 according to the foregoing example embodiments or a modified or combined structure thereof.

The processor 220 controls the overall operation of the IoT device 200. The processor 220 controls the operations of the directional acoustic sensor 210, the speaker 240, and the communication unit 250, uses a related control signal, and executes programs stored in the memory 230.

The memory 230 may include a movable device control module 234 programmed to rotate or move the movable device 240 in a specific direction based on a control signal. The movable device control module 234 controls the movable device 240 to rotate or move in a direction oriented toward or away from a direction of a sound sensed by the directional acoustic sensor 210, taking into account the signal sensed by the directional acoustic sensor 210 or an execution result of an application associated with the signal. However, this is only an example, and a various directions of the movable device control may be based on an application execution result reflecting the signal sensed by the directional acoustic sensor 210.

The memory 230 may further include a learning module 236 programmed to learn whether a signal received by the directional acoustic sensor 200 is a valid received signal, in association with a direction. The learning module 236 may repeatedly generate and accumulate, as training data, a direction of a sound sensed by the directional acoustic sensor 200 and a result of determining whether the signal is a valid signal, and extract statistic features from the accumulated training data, thereby processing a sound received from a specific direction as an invalid signal.

The memory 230 may also store any of various programs and data needed for the processor 220 to control the overall operations of the IoT device 200.

The memory 230 may include a storage medium of at least one type of a flash memory type, a hard disk type, a multimedia card micro type, a card type memory (e.g., a secure digital (SD) or extreme digital (XD) memory, etc.), a random-access memory (RAM), a static random-access memory (SRAM), a read-only memory (ROM), an electrically erasable programmable read-only memory (EEPROM), a programmable read-only memory (PROM), a magnetic memory, a magnetic disk, an optical disk, and so forth.

The communication unit 250 may communicate with an external device by using Bluetooth communication, Bluetooth low energy (BLE) communication, near field communication (NFC), wireless local area network (WLAN) (e.g., wireless fidelity (WiFi)) communication, Zigbee communication, Infrared Data Association (IrDA) communication, WiFi direct (WFD), ultra-wideband (UWB) communication, Ant+ communication, WiFi communication, or the like.

Referring to FIG. 25, the movable device 240 included in the IoT device 200 is illustrated as a rotatable speaker. In the following description, a speaker will be described as an example of the movable device 240, but the movable device 240 is not limited to this example. The IoT device 200 determines directions of received sound signals S1 and S2 and rotates the speaker toward the determined directions.

The IoT device 200 identifies a valid signal between the received sound signals S1 and S2. For example, the IoT device 200 may distinguish between the sound signal S1 from a user U and the sound signal S2 from a sound source NU that is not a user. Such distinguishing may be possible based on learning of whether an received signal is a valid signal in association with a direction of the received sound. Thus, for example, after the IoT device 200 determines that an invalid signal is continuously received from a direction from a fixed position like with a TV, the speaker may be rotated in a direction of the valid signal S2 between the received sound signals S1 and S2, and an application related with the signal S2 may be executed.

The IoT device 200 may be used as an artificial intelligent (AI) speaker, and may be used in conjunction with any of various devices, thus improving the utilization of functions of the devices.

Figure 26:
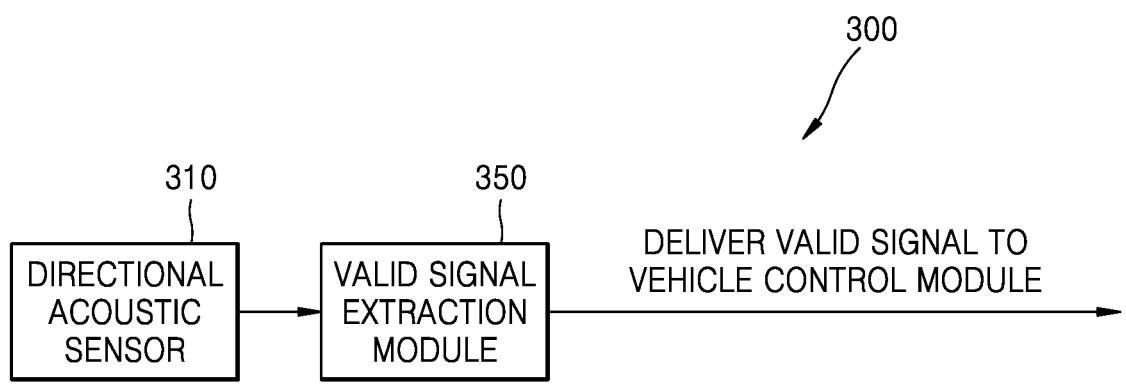
FIG. 26 is a block diagram showing a schematic configuration of a vehicle voice interface device according to an example embodiment.
Figure 27:
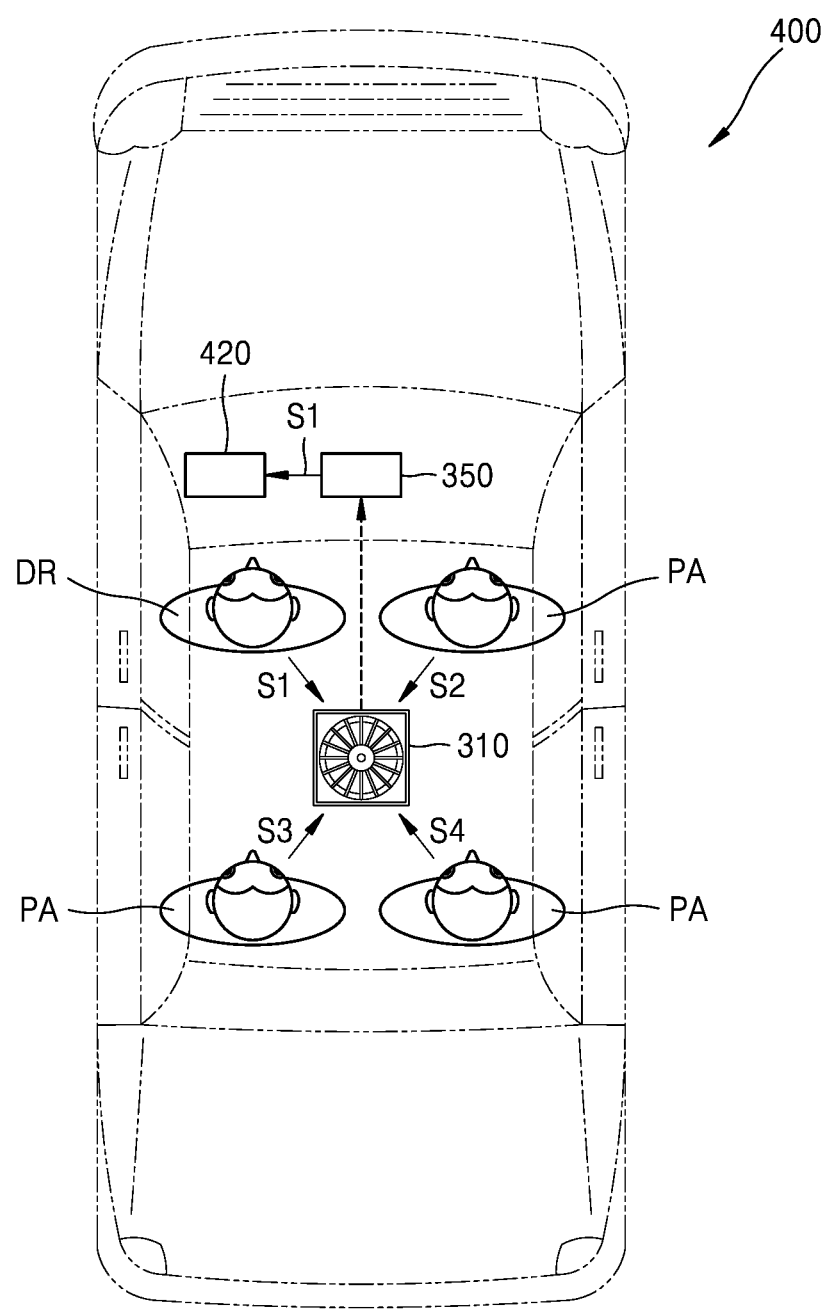
FIG. 27 illustrates an operation in which a vehicle voice interface device according to an example embodiment is applied to a vehicle.

FIG. 26 is a block diagram showing a schematic configuration of a vehicle voice interface device according to an example embodiment, and FIG. 27 illustrates an operation in which a vehicle voice interface device according to an example embodiment is applied to a vehicle.

A vehicle voice interface device 300 may include a directional acoustic sensor 310 and a valid signal extraction module 350. The valid signal extraction module 350 may include a memory that stores a program for processing valid signal extraction and a processor that executes the program.

The directional acoustic sensor 310 may be any one of the directional acoustic sensors 100, 101, 102, 103, 104, and 105 according to the foregoing embodiments or a modified or combined structure thereof.

The valid signal extraction module 350 determines whether a signal received by the directional acoustic sensor 310 is a valid signal based on a direction of the signal, and delivers the signal to a vehicle control module when the signal is a valid signal. From among the sounds received from various directions, the valid signal extraction module 350 cancels, as noise, sound signals received from directions other than the direction of a driver, and delivers the received sounds to the vehicle control module.

Referring to FIG. 27, the directional acoustic sensor 310 included in a vehicle 400 senses a sound signal S1 from a driver DR and sound signals S2, S3, and 54 from passengers PA. The directional acoustic sensor 310 identifies a direction of a received sound signal and delivers the sensing result to the valid signal extraction module 350. The valid signal extraction module 350 delivers only the sound signal S1 from the driver DR to the vehicle control module 420.

Figure 28:
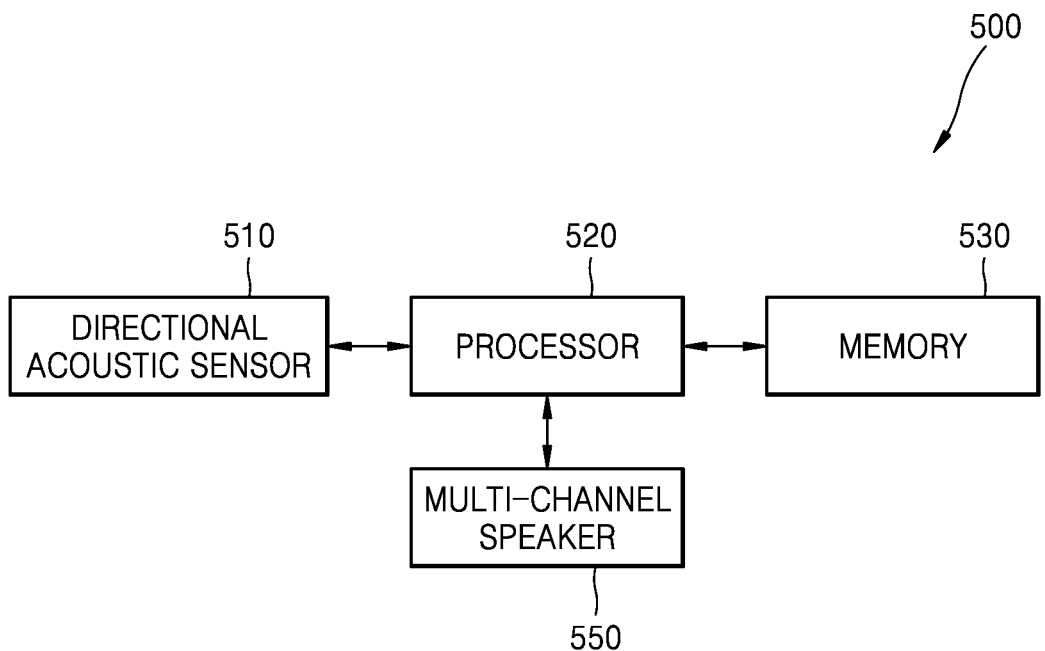
FIG. 28 is a block diagram showing a schematic configuration of a spatial recording device according to an example embodiment.

FIG. 28 is a block diagram showing a schematic configuration of a spatial recording device according to an example embodiment.

A spatial recording device 500 may include a directional acoustic sensor 510, a processor 520 that analyzes a signal sensed by the directional acoustic sensor 510 and determines a direction of a sound received by the directional acoustic sensor 510, and a memory 530 in which a program for signal processing by the processor 520 and an execution result of the processor 520 are stored.

The directional acoustic sensor 510 may be any one of the directional acoustic sensors 100, 101, 102, 103, 104, and 105 according to the foregoing example embodiments or a modified or combined structure thereof. The directional acoustic sensor 510 records a nearby sound in association with a direction. The directional acoustic sensor 510 estimates a received direction of a sound at a high resolution.

The spatial recording device 500 performs recording, focusing on or selecting only a desired sound source, by using a result of estimation of a received direction of a sound.

The spatial recording device 500 may further include a multi-channel speaker 550 to play the recorded sound suitably for a direction. The processor 510 controls the multi-channel speaker 550 such that a sound signal stored in the memory 530 may be played appropriately to a direction. By playing a recorded sound source suitably for a direction, a sense of realism of recorded contents may be augmented, and a sense of immersion and a sense of reality may be improved.

The spatial recording device 500 may be used in an augmented reality (AR) or virtual reality (VR) device.

Figure 29:
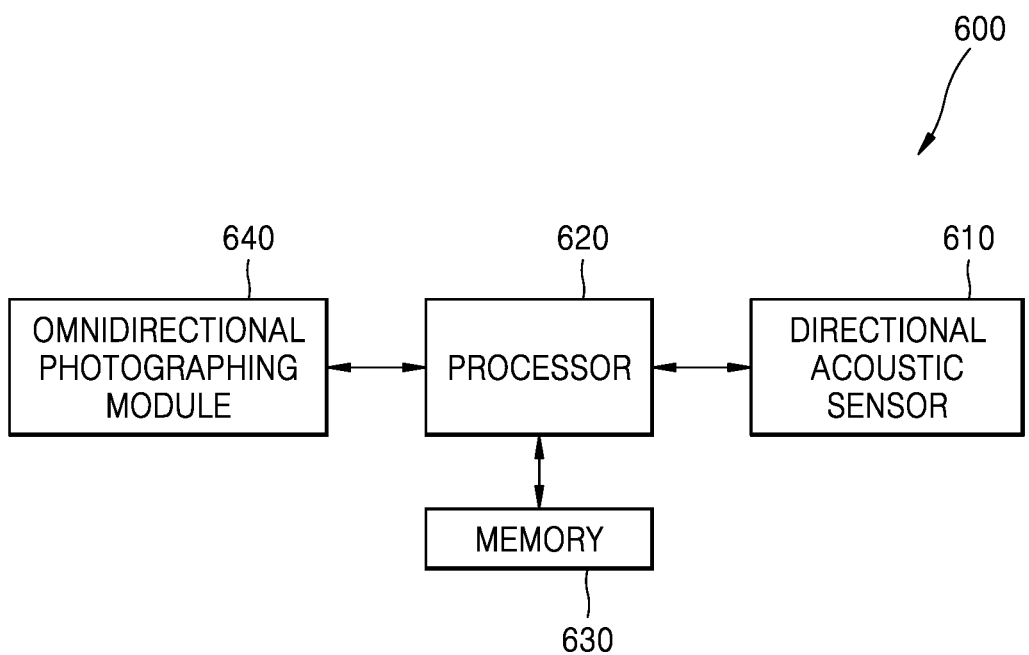
FIG. 29 is a block diagram illustrating a schematic structure of an omni-directional camera according to an example embodiment.

FIG. 29 is a block diagram illustrating a schematic structure of an omni-directional camera according to an example embodiment.

An omnidirectional camera 600 is capable of panoramic photography with respect to an object placed omnidirectionally. The omnidirectional camera 600 may include a directional acoustic sensor 610, an omnidirectional photographing module 640, a processor 620 that controls the directional acoustic sensor 610 and the omnidirectional photographing module 640 such that a directional sound signal sensed by the directional acoustic sensor 610 matches an omnidirectional image signal captured by the omnidirectional photographing module 640, and a memory 630 that stores the directional sound signal and the omnidirectional image signal.

A typical panorama photographing module may be used as the omnidirectional photographing module 640, and the omnidirectional photographing module 640 may adopt a form including optical lenses, an image sensor, and so forth in a main body capable of rotating 360 degrees.

The directional acoustic sensor 610 may be any one of the directional acoustic sensors 100, 101, 102, 103, 104, and 105 according to the foregoing example embodiments or a modified or combined structure thereof, and may sense a sound in all directions and identify a direction.

Under control of the processor 620, a sound in a direction corresponding to a photographing direction of the omnidirectional photographing module 640, from among signals sensed by the directional acoustic sensor 610, may be selectively stored in the memory 630. In this way, by the omnidirectional camera 600, a 360° panorama image signal and a sound signal matching the 360° panorama image signal may be stored in the memory 630. Such image/sound information are played by a display device including a multi-channel speaker and maximize a sense of realism, and are applicable to an AR/VR device.

Electronic devices according to example embodiments may include a processor, a memory for storing program data and executing it, a permanent storage such as a disk drive, a communications port for communicating with external devices, and user interface devices, such as a touch panel, a key, a button, etc.

Methods implemented with a software module or algorithm in an electronic device according to the above-described example embodiments may be stored as computer-readable codes or program instructions executable on the processor on computer-readable recording media. Examples of the computer-readable recording media may include a magnetic storage medium (e.g., read-only memory (ROM), random-access memory (RAM), floppy disk, hard disk, etc.) and an optical medium (e.g., a compact disc-ROM (CD-ROM), a digital versatile disc (DVD), etc.) The computer-readable recording medium may be distributed over network coupled computer systems so that a computer-readable code is stored and executed in a distributed fashion. The medium may be read by a computer, stored in a memory, and executed by a processor.

The directional acoustic sensor according to an example embodiment has one small-size sensor structure including a plurality of vibration bodies reacting to different directions, and may identify a direction of a received sound at a high resolution.

The directional acoustic sensor according to an example embodiment may include a plurality of vibration bodies having different resonant frequencies, and in this case, may properly set and use a resolution of a direction and a frequency bandwidth suitably for an environment.

The directional acoustic sensor according to an example embodiment is applicable to various electronic devices using a sensed directional sound.

While the directional acoustic sensor and the electronic device including the same have been shown and described in connection with example embodiments, it will be apparent to those of ordinary skill in the art that modifications and variations can be made without departing from the spirit and scope of the appended claims. Therefore, the disclosed example embodiments should be considered in an illustrative sense rather than a restrictive sense. The scope of the specification will be in the appended claims, and all of the differences in the equivalent range thereof should be understood to be included in the specification.

What is claimed is:

1. A directional acoustic sensor comprising:
   a sound inlet through which a sound is received;
   a sound outlet through which the sound, received through the sound inlet, is output, wherein the sound outlet is disposed below the sound inlet; and
   a plurality of vibration bodies arranged between the sound inlet and the sound outlet, wherein one or more of the plurality of vibration bodies selectively react to the sound received through the sound inlet according to a direction of the received sound,
   wherein the sound outlet comprises a plurality of sound outlets, the plurality of sound outlets respectively corresponding to and overlapping with, in a vertical direction, the plurality of vibration bodies.

2. The directional acoustic sensor of claim 1, wherein the plurality of vibration bodies are arranged on a single plane in an array surrounding a central point on the plane, wherein the central point is aligned, in the vertical direction, with a center of the sound inlet.

3. The directional acoustic sensor of claim 2, wherein the array is symmetric with respect to the central point.

4. The directional acoustic sensor of claim 3, wherein the plurality of vibration bodies are radially arranged such that the array has a shape of one of a circle, an oval, and a polygon.

5. The directional acoustic sensor of claim 1, wherein each of the plurality of vibration bodies has a same resonant frequency.

6. The directional acoustic sensor of claim 1, wherein the plurality of vibration bodies comprises at least a first vibration body having a first resonant frequency and a second vibration body having a second resonant frequency, different from the first resonant frequency.

7. The directional acoustic sensor of claim 6,
wherein the plurality of vibration bodies are grouped into
a plurality of subgroups, each subgroup oriented in a different direction; and
wherein each of the plurality of subgroups comprises a plurality of vibration bodies comprising a first vibration body having a first resonant frequency and a second vibration body having a second resonant frequency, different from the first resonant frequency.

8. The directional acoustic sensor of claim 7, wherein the plurality of vibration bodies of each of the plurality of subgroups are arranged in an order of magnitude of resonant frequency.

9. The directional acoustic sensor of claim 8, wherein, of the plurality of subgroups, adjacent subgroups comprise pluralities of vibration bodies arranged in opposite orders of magnitude of resonant frequency.

10. The directional acoustic sensor of claim 7, wherein the plurality of subgroups are arranged such that vibration bodies, arranged symmetrically to each other with respect to a central point of arrangement of the plurality of vibration bodies, have an identical resonant frequency.

11. An Internet of Things (IoT) device comprising:
the directional acoustic sensor according to claim 1, configured to receive a voice signal provided by a user;
a memory in which an application module is stored; and
a processor configured to execute the application module.

12. The IoT device of claim 11, further comprising:
a movable device; and
a control module configured to move the movable device in a specific direction based on an execution result of executed using a signal received by the directional acoustic sensor as an input variable.

13. The IoT device of claim 12, wherein the movable device comprises an output device configured to output the execution result of an application module.

14. The IoT device of claim 11, further comprising a learning module configured to learn whether a sound signal received by the directional acoustic sensor is a valid sound signal in association with a direction.

15. A vehicle voice interface device comprising:
the directional acoustic sensor according to claim 1; and
a valid signal extraction module configured to determine whether a sound signal received by the directional acoustic sensor is a valid sound signal based on a direction of the sound signal, and to deliver the sound signal to a vehicle control module when the sound signal is a valid sound signal.

16. The vehicle voice interface device of claim 15, wherein the valid signal extraction module is further configured to cancel, as noise, a sound signal having a direction different from a direction of a driver and to deliver a noise-cancelled sound signal to the vehicle control module.

17. A spatial recording device comprising:
the directional acoustic sensor according to claim 1;
a processor configured to determine a direction of a sound signal received by the directional acoustic sensor by analyzing the sound signal sensed by the directional acoustic sensor; and
a memory in which a program for signal processing by the processor and an execution result of the processor are stored.

18. The spatial recording device of claim 17, further comprising a multi-channel speaker,
wherein the processor is further configured to control the multi-channel speaker such that an audio signal stored in the memory is played appropriately to a direction.

19. An omnidirectional camera comprising:
the directional acoustic sensor according to claim 1;
an omnidirectional photographing module;
a processor configured to control the directional acoustic sensor and the omnidirectional photographing module such that a directional sound signal sensed by the directional acoustic sensor and an omnidirectional image signal captured by the omnidirectional photographing module match each other; and
a memory in which the directional sound signal and the omnidirectional image signal are stored.

20. A method of detecting a direction of a sound, the method comprising:
providing a vibration body array comprising a plurality of vibration bodies arranged such that one or more of the plurality of vibration bodies selectively react to a received sound based on a direction of the received sound;
providing a plurality of sound outlets through which sound received is outlet such that the plurality of sound outlets respectively correspond to and overlap with, in a vertical direction, the plurality of vibration bodies; and
estimating a sound source distribution profile of a target sound by comparing outputs of the plurality of vibration bodies with each other, when the target sound is received to the vibration body array.

21. The method of claim 20, further comprising, setting a matching graph for estimating a direction of a received sound based on an output of each of the plurality of vibration bodies,
wherein the estimating of the direction of the received sound comprises determining a direction of the target sound by comparing an amplitude of one or more vibration bodies reacting to the target sound with the matching graph.

22. The method of claim 21, wherein the setting the matching graph comprises setting a plurality of matching graphs indicating a relationship between an amplitude difference between two vibration bodies included in the vibration body array and a direction of a received sound.

23. A directional acoustic sensor comprising:
a case;
an input opening formed in an upper side of the case;
an output opening formed in a lower side of the case; and
an array, comprising a plurality of vibration bodies, disposed within the case between the input opening and the output opening, wherein the output opening comprises a plurality of output openings, the plurality of output openings respectively corresponding to and overlapping with, in a vertical direction, the plurality of vibration bodies.

* * * * *